US011137522B2

(12) United States Patent
Mita et al.

(10) Patent No.: US 11,137,522 B2
(45) Date of Patent: Oct. 5, 2021

(54) ONE-SIDE-PROTECTED POLARIZING FILM, PRESSURE-SENSITIVE-ADHESIVE-LAYER-ATTACHED POLARIZING FILM, IMAGE DISPLAY DEVICE, AND METHOD FOR CONTINUOUSLY PRODUCING SAME

(71) Applicant: NITTO DENKO CORPORATION, Ibaraki (JP)

(72) Inventors: Satoshi Mita, Osaka (JP); Tomonori Ueno, Osaka (JP); Jingfan Xu, Osaka (JP); Yusuke Motegi, Osaka (JP); Atsushi Kishi, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 47 days.

(21) Appl. No.: 15/515,948

(22) PCT Filed: Sep. 29, 2015

(86) PCT No.: PCT/JP2015/077590
§ 371 (c)(1),
(2) Date: Mar. 30, 2017

(87) PCT Pub. No.: WO2016/052549
PCT Pub. Date: Apr. 7, 2016

(65) Prior Publication Data
US 2017/0299779 A1  Oct. 19, 2017

(30) Foreign Application Priority Data

Sep. 30, 2014 (JP) .............................. JP2014-202622
Sep. 30, 2014 (JP) .............................. JP2014-202623
(Continued)

(51) Int. Cl.
*G02B 1/14* (2015.01)
*C08F 222/10* (2006.01)
(Continued)

(52) U.S. Cl.
CPC ................. *G02B 1/14* (2015.01); *B32B 7/12* (2013.01); *B32B 37/12* (2013.01); *C08F 222/10* (2013.01);
(Continued)

(58) Field of Classification Search
CPC ............................... G02B 1/14; G02B 5/3025
See application file for complete search history.

(56) References Cited

U.S. PATENT DOCUMENTS 10,061,066 B2 *  8/2018  Ueno ..................... G02B 1/14
10,067,268 B2 *  9/2018  Mita ......................... C09J 7/29
(Continued)

FOREIGN PATENT DOCUMENTS

CN  1550798 A  12/2004
CN  1774654 A  5/2006
(Continued)

OTHER PUBLICATIONS

Machine translation of JP-2011017820-A, 2019 (Year: 2019).*
(Continued)

*Primary Examiner* — Liam J Heincer
(74) *Attorney, Agent, or Firm* — Westerman, Hattori, Daniels & Adrian, LLP

(57) ABSTRACT

The present invention pertains to a one-side-protected polarizing film having a protective film or films on only one surface of a polarizer, wherein: the polarizer contains a polyvinyl alcohol-based resin, and is designed to have a single-body transmittance T and a polarization degree P representing optical properties satisfying the condition of the following formula: $P>-(10^{0.929T-42.4}-1)\times 100$ (provided that
(Continued)

T<42.3) or P≥99.9 (provided that T≥42.3), and the polarizer and a transparent resin layer have a thickness X (μm) and a thickness Y (μm), respectively, satisfying X≤12, Y≤15, and 0.15≤(Y/X)≤3. Even when the thin-type polarizer has prescribed optical properties, this one-side-protected polarizing film is capable of suppressing the occurrence of through cracks, nano-slit-induced defects and curling.

17 Claims, 7 Drawing Sheets

(30) Foreign Application Priority Data

| Sep. 30, 2014 | (JP) | JP2014-202624 |
|---|---|---|
| Feb. 13, 2015 | (JP) | JP2015-026586 |
| Aug. 27, 2015 | (JP) | JP2015-167695 |
| Sep. 28, 2015 | (JP) | JP2015-189273 |
| Sep. 28, 2015 | (JP) | JP2015-189274 |
| Sep. 28, 2015 | (JP) | JP2015-189275 |
| Sep. 28, 2015 | (JP) | JP2015-189276 |
| Sep. 28, 2015 | (JP) | JP2015-189278 |
| Sep. 28, 2015 | (JP) | JP2015-189281 |

(51) Int. Cl.

| C09D 129/04 | (2006.01) |
|---|---|
| B32B 7/12 | (2006.01) |
| B32B 37/12 | (2006.01) |
| C09J 129/04 | (2006.01) |
| C09J 133/02 | (2006.01) |
| C09J 163/00 | (2006.01) |
| G02B 5/30 | (2006.01) |
| G02F 1/1335 | (2006.01) |
| C09J 133/06 | (2006.01) |
| B32B 37/00 | (2006.01) |

(52) U.S. Cl.
CPC .......... *C09D 129/04* (2013.01); *C09J 129/04* (2013.01); *C09J 133/02* (2013.01); *C09J 163/00* (2013.01); *G02B 5/3025* (2013.01); *G02F 1/133528* (2013.01); *B32B 37/0053* (2013.01); *B32B 2307/42* (2013.01); *B32B 2457/202* (2013.01); *C09J 133/064* (2013.01)

(56) References Cited

U.S. PATENT DOCUMENTS

| 10,094,954 | B2* | 10/2018 | Xu | G02B 1/14 |
|---|---|---|---|---|
| 2003/0151705 | A1* | 8/2003 | Saiki | G02B 5/3083 |
| | | | | 349/96 |
| 2006/0108050 | A1* | 5/2006 | Satake | B32B 3/02 |
| | | | | 156/101 |
| 2006/0182896 | A1 | 8/2006 | Murakami et al. | |
| 2006/0227423 | A1 | 10/2006 | Saiki et al. | |
| 2007/0207277 | A1 | 9/2007 | Mizushima et al. | |
| 2008/0137187 | A1 | 6/2008 | Nishida et al. | |
| 2009/0033833 | A1* | 2/2009 | Aminaka | C09J 133/06 |
| | | | | 349/68 |
| 2009/0091826 | A1 | 4/2009 | Sugino | |
| 2009/0099308 | A1* | 4/2009 | Takebe | C08B 3/16 |
| | | | | 525/54.21 |
| 2009/0122401 | A1 | 5/2009 | Shinagawa et al. | |
| 2009/0162617 | A1* | 6/2009 | Moroishi | G02B 5/0242 |
| | | | | 428/172 |
| 2009/0263608 | A1 | 10/2009 | Kitada et al. | |
| 2010/0221455 | A1 | 9/2010 | Kim et al. | |
| 2010/0304134 | A1* | 12/2010 | Nakano | C09J 7/385 |
| | | | | 428/343 |
| 2011/0043733 | A1* | 2/2011 | Suzuki | C09J 135/04 |
| | | | | 349/96 |
| 2011/0090434 | A1* | 4/2011 | Takebe | G02B 5/3033 |
| | | | | 349/96 |
| 2011/0163281 | A1 | 7/2011 | Bae et al. | |
| 2012/0055607 | A1 | 3/2012 | Kitagawa et al. | |
| 2012/0055608 | A1 | 3/2012 | Kitagawa et al. | |
| 2012/0055621 | A1 | 3/2012 | Goto et al. | |
| 2012/0055622 | A1 | 3/2012 | Kitagawa et al. | |
| 2012/0055623 | A1 | 3/2012 | Kitagawa et al. | |
| 2012/0056211 | A1 | 3/2012 | Kitagawa et al. | |
| 2012/0056340 | A1 | 3/2012 | Kitagawa et al. | |
| 2012/0057104 | A1 | 3/2012 | Kitagawa et al. | |
| 2012/0057231 | A1 | 3/2012 | Goto et al. | |
| 2012/0058291 | A1 | 3/2012 | Kitagawa et al. | |
| 2012/0058321 | A1 | 3/2012 | Goto et al. | |
| 2012/0206804 | A1 | 8/2012 | Nam et al. | |
| 2012/0314160 | A1* | 12/2012 | Hwang | G02B 5/3041 |
| | | | | 349/96 |
| 2012/0327510 | A1* | 12/2012 | Chiba | C09J 133/08 |
| | | | | 359/483.01 |
| 2013/0107173 | A1* | 5/2013 | Takeda | G02B 5/23 |
| | | | | 349/96 |
| 2013/0135729 | A1* | 5/2013 | Hirata | B29D 11/0073 |
| | | | | 359/492.01 |
| 2013/0141787 | A1 | 6/2013 | Kim et al. | |
| 2013/0170035 | A1* | 7/2013 | Jung | G02B 5/30 |
| | | | | 359/492.01 |
| 2013/0220525 | A1 | 8/2013 | Kunai | |
| 2013/0293949 | A1* | 11/2013 | Saito | C09J 4/00 |
| | | | | 359/352 |
| 2013/0299070 | A1 | 11/2013 | Kawamura | |
| 2014/0057060 | A1 | 2/2014 | Fukagawa et al. | |
| 2014/0065429 | A1 | 3/2014 | Kunikata et al. | |
| 2014/0085722 | A1 | 3/2014 | Yasui et al. | |
| 2014/0186554 | A1* | 7/2014 | Jung | C09J 133/066 |
| | | | | 428/1.55 |
| 2014/0285887 | A1 | 9/2014 | Goto et al. | |
| 2014/0370277 | A1* | 12/2014 | Higashi | C08F 265/06 |
| | | | | 428/345 |
| 2015/0062503 | A1* | 3/2015 | Yoon | C09J 153/005 |
| | | | | 349/96 |
| 2015/0070761 | A1 | 3/2015 | Kitagawa et al. | |
| 2015/0124194 | A1* | 5/2015 | Oya | G02B 5/3083 |
| | | | | 349/61 |
| 2015/0205025 | A1* | 7/2015 | Park | C09J 133/08 |
| | | | | 349/96 |
| 2015/0346408 | A1* | 12/2015 | Mizutani | C09J 133/08 |
| | | | | 428/41.5 |
| 2016/0327711 | A1* | 11/2016 | Ishiguro | C08F 222/10 |
| 2016/0363699 | A1 | 12/2016 | Kunai | |
| 2017/0121565 | A1* | 5/2017 | Yasui | C09J 133/066 |
| 2017/0123266 | A1* | 5/2017 | Takada | B32B 3/266 |
| 2017/0210915 | A1* | 7/2017 | Lee | G02B 5/3033 |
| 2017/0235023 | A1* | 8/2017 | Mita | C09J 7/29 |
| | | | | 428/354 |
| 2017/0235024 | A1* | 8/2017 | Xu | G02B 1/14 |
| | | | | 359/487.02 |
| 2017/0299790 | A1* | 10/2017 | Ueno | G02B 1/14 |
| 2017/0299919 | A1* | 10/2017 | Miyai | B32B 27/00 |
| 2017/0299920 | A1* | 10/2017 | Mita | C08K 5/0025 |
| 2018/0024283 | A1* | 1/2018 | Motegi | G02B 5/305 |
| | | | | 359/485.03 |
| 2018/0031746 | A1* | 2/2018 | Ueno | B32B 7/02 |

FOREIGN PATENT DOCUMENTS

| CN | 1860389 | A | 11/2006 |
|---|---|---|---|
| CN | 101228462 | A | 7/2008 |
| CN | 101387718 | A | 3/2009 |
| CN | 101692133 | A | 4/2010 |
| CN | 102667547 | A | 9/2012 |
| CN | 102754002 | A | 10/2012 |
| CN | 102834748 | A | 12/2012 |
| CN | 103135160 | A | 6/2013 |
| CN | 103562759 | A | 2/2014 |
| JP | 9-104478 | A | 4/1997 |

(56) References Cited

FOREIGN PATENT DOCUMENTS

| | | | |
|---|---|---|---|
| JP | 10-308198 A | 11/1998 | |
| JP | 2003-121618 A | 4/2003 | |
| JP | 2004-61565 A | 2/2004 | |
| JP | 2004-223993 A | 8/2004 | |
| JP | 2005-43858 A | 2/2005 | |
| JP | 2005-84113 A | 3/2005 | |
| JP | 2009-169333 A | 7/2009 | |
| JP | 2009-211057 A | 9/2009 | |
| JP | 2010-9027 A | 1/2010 | |
| JP | 4406043 B2 | 1/2010 | |
| JP | 2011017820 A | * 1/2011 | |
| JP | 4691205 B1 | 6/2011 | |
| JP | 4751481 B1 | 8/2011 | |
| JP | 2011-221185 A | 11/2011 | |
| JP | 2011-221278 A | 11/2011 | |
| JP | 2011-227450 A | 11/2011 | |
| JP | 2013-68804 A | 4/2013 | |
| JP | 2013-72951 A | 4/2013 | |
| JP | 2013-142863 A | 7/2013 | |
| JP | 2013142863 A | * 7/2013 | |
| JP | 2013-160775 A | 8/2013 | |
| JP | 2013-254072 A | 12/2013 | |
| JP | 2014-59547 A | 4/2014 | |
| JP | 5504232 B2 | 5/2014 | |
| JP | 2014-119501 A | 6/2014 | |
| JP | 2014-182321 A | 9/2014 | |
| JP | 2014-206725 A | 10/2014 | |
| JP | 2015-129826 A | 7/2015 | |
| JP | 2015-161782 A | 9/2015 | |
| KR | 10-2006-0009837 A | 2/2006 | |
| KR | 10-2010-0097076 A | 9/2010 | |
| KR | 10-2011-0078782 A | 7/2011 | |
| KR | 10-2012-0099172 A | 9/2012 | |
| KR | 10-1326205 B1 | 1/2013 | |
| KR | 10-2013-0018227 A | 2/2013 | |
| KR | 10-2014-074260 A | 6/2014 | |
| KR | 10-2014-0114733 A | 9/2014 | |
| TW | 201430405 A | 8/2014 | |
| TW | 201434643 A | 9/2014 | |
| WO | 2009/099049 A1 | 8/2009 | |
| WO | 2009/145150 A1 | 12/2009 | |
| WO | 2011/125958 A1 | 10/2011 | |
| WO | 2013/042795 A1 | 3/2013 | |
| WO | 2013/047884 A1 | 4/2013 | |
| WO | 2014/091894 A1 | 6/2014 | |
| WO | 2015/194523 A1 | 12/2015 | |

OTHER PUBLICATIONS

Machine Translation of JP 2013-142863, 2020 (Year: 2020).*
Machine translation of JP 2013-068804, 2020 (Year: 2020).*
Office Action dated Jan. 3, 2018 , issued in Chinese application No. 201580053067.4 which is counterpart to related U.S. Appl. No. 15/515,887, with English translation. (13 pages).
Office Action dated Mar. 20, 2018, issued in Chinese Application No. 201580053076.3, which is counterpart to related U.S. Appl. No. 15/515,890, with English translation. (16 pages).
Notice of Allowance dated Mar. 28, 2018, issued in Korean Application No. 10-2017-7009610, which is counterpart to related U.S. Appl. No. 15/515,890, with English translation. (5 pages).
International Search Report dated Dec. 22, 2015, issued in counterpart International Application No. PCT/JP2015/077590 (4 pages).
Decision to Grant a Patent dated Sep. 6, 2016, issued in counterpart Japanese Patent Application No. 2015-189275 (6 pages).
Notification of Reasons for Refusal dated Aug. 23, 2016, issued in counterpart Japanese Patent Application No. 2015-189273 (8 pages).
Notification of Reasons for Refusal dated Aug. 23, 2016, issued in counterpart Japanese Patent Application No. 2015-189274 (8 pages).
Notification of Reasons for Refusal dated Aug. 23, 2016, issued in counterpart Japanese Patent Application No. 2015-189276 (8 pages).
Notification of Reasons for Refusal dated Aug. 23, 2016, issued in counterpart Japanese Patent Application No. 2015-189278 (13 pages).
Office Action dated May 9, 2017 issued in Taiwanese application No. 104132127 (counterpart to U.S. Appl. No. 15/515,885), with English translation. (6 pages).
Office Action dated Oct. 27, 2017, issued in Korean Application No. 10-2017-7009611, with English translation (7 pages).
Office Action dated Nov. 9, 2017, issued in Korean Application No. 10-2017-7009610, with English translation (7 pages).
Office Action dated Oct. 27, 2017, issued in to Korean Application No. 10-2017-7009090, with English translation (9 pages).
Office Action dated Oct. 10, 2017, issued in Chinese Application No. 201580053060.2, with English translation (11 pages).
Office Action dated Oct. 16, 2017, issued in Chinese Application No. 201580053076.3 , with English translation (11 pages).
Notice of Allowance dated Oct. 30, 2017, issued in Korean Application No. 10-2017-7009089, with English translation (8 pages).
Office Action dated Oct. 27, 2017, issued in Korean Application No. 10-2017-7008777, with English translation (4 pages).
Office Action dated Mar. 21, 2018, issued in Chinese Application No. 201580053094.1, with English translation. (15 pages).
Office Action dated Jan. 12, 2018, issued in Chinese Application No. 201580053095.6, with English translation (14 pages).
Office Action dated Oct. 31, 2018, issued in Chinese application No. 201580053067.4, (counterpart to U.S. Appl. No. 15/515,887) with English translation. (11 pages).
Notice of Allowance dated Feb. 27, 2018, issued in Korean application No. 10-2017-7009090 which is counterpart to related U.S. Appl. No. 15/515,385 (3 pages).
Office Action dated Feb. 26, 2018, issued in Korean application No. 10-2017-7009611 which is counterpart to related U.S. Appl. No. 15/515,885 (7 pages) with machine translation.
Notice of Allowance dated Jun. 21, 2018, issued in Korean Patent Application No. 10-2017-7009611 (3 pages).
Notification of Transmittal of Translation of the International Preliminary Report on Patentability (Form PCT/IB/338) issued in counterpart International Application No. PCT/JP2015/077590 dated Apr. 13, 2017, with Forms PCT/IB/373 and PCT/ISA/237. (13 pages).
Office Action dated Mar. 28, 2019, issued in counterpart TW Application No. 104132116, with English translation. (12 pages).
Office Action dated Jan. 14, 2019, issued in counterpart Chinese Patent Application No. 201580053066 with English translation. (20 pages).
Office Action dated Jul. 31, 2019 , issued in JP Application No. 2015-189281, with English translation (10 pages).
Office Action dated Sep. 12, 2019, issued in counterpart CN application No. 201580053066.X, with English translation. (18 pages).
Office Action dated Mar. 5, 2020, issued in counterpart CN application No. 201580053066.X, with English translation. (21 pages).
Office Action dated Feb. 19, 2020, issued in counterpart JP application No. 2015-189281, with English translation. (6 pages).
Office Action dated Sep. 1, 2020, issued in counterpart to JP Application No. 2020-006792, with English translation (10 pages).
Office Action dated Sep. 1, 2020, issued in counterpart to JP Application No. 2015-189281, with English translation (10 pages).
Office Action dated Feb. 3, 2021, issued in counterpart to JP Application No. 2015-189281, with English translation (8 pages).

* cited by examiner

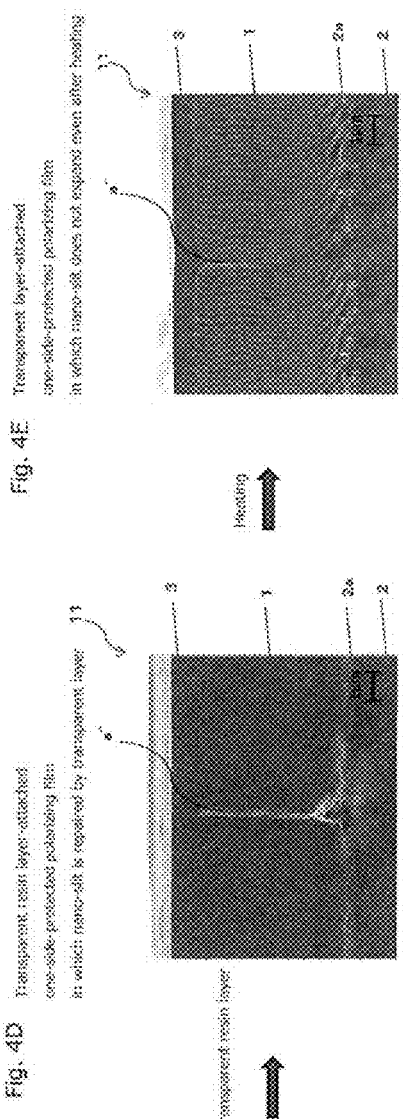

Transmission axis

ONE-SIDE-PROTECTED POLARIZING FILM, PRESSURE-SENSITIVE-ADHESIVE-LAYER-ATTACHED POLARIZING FILM, IMAGE DISPLAY DEVICE, AND METHOD FOR CONTINUOUSLY PRODUCING SAME

TECHNICAL FIELD

The invention relates to a one-side-protected polarizing film including a polarizer and a protective film provided on only one surface of the polarizer and to a pressure-sensitive-adhesive-layer-attached polarizing film including the one-side-protected polarizing film and a pressure-sensitive adhesive layer. The one-side-protected polarizing film and the pressure-sensitive-adhesive-layer-attached polarizing film may be used alone or as a component of a multilayer optical film to form an image display device such as a liquid crystal display (LCD) or an organic electroluminescent (EL) display.

BACKGROUND ART

The image forming system of liquid crystal display devices has polarizing films placed as essential components on both sides of glass substrates that form the liquid crystal panel surfaces. A polarizing film generally used includes a polarizer and a protective film or films bonded to one or both surfaces of the polarizer with a polyvinyl alcohol-based adhesive or any other adhesive, in which the polarizer includes a polyvinyl alcohol-based film and a dichroic material such as iodine.

In general, a pressure-sensitive adhesive is used to bond such a polarizing film to a liquid crystal cell or any other component. The pressure-sensitive adhesive is provided as a pressure-sensitive adhesive layer in advance on one surface of the polarizing film because such a pressure-sensitive adhesive layer has advantages such as the ability to instantly fix the polarizing film and no need to perform a drying step for fixing the polarizing film. Thus, a pressure-sensitive-adhesive-layer-attached polarizing film is generally used when a polarizing film is bonded.

Polarizing films and pressure-sensitive-adhesive-layer-attached polarizing films have a problem in that in a harsh environment accompanied by thermal shock (e.g., a heat shock test in which −30° C. and 80° C. temperature conditions are repeated, or a test at a high temperature of 100° C.), the polarizer undergoes changes in shrinkage stress, so that cracks (through cracks) can easily occur entirely in the direction of the absorption axis of the polarizer. In other words, pressure-sensitive-adhesive-layer-attached polarizing films have insufficient durability to thermal shock in the harsh environment mentioned above. For thickness reduction, a pressure-sensitive-adhesive-layer-attached polarizing film can be produced using a one-side-protected polarizing film including a polarizer and a protective film provided on only one surface of the polarizer. Particularly, such a pressure-sensitive-adhesive-layer-attached polarizing film has insufficient durability to the thermal shock mentioned above. In addition, the thermal shock-induced through cracks become more likely to occur as the size of the polarizing film increases.

In order to suppress the occurrence of the through cracks, for example, it is proposed to provide a pressure-sensitive-adhesive-layer-attached polarizing film including a one-side-protected polarizing film, a protective layer provided on the polarizing film and having a tensile elastic modulus of 100 MPa or more, and a pressure-sensitive adhesive layer provided on the protective layer (Patent Document 1). It is also proposed to provide a pressure-sensitive-adhesive-layer-attached polarizing film including a polarizer with a thickness of 25 μm or less, a protective layer provided on one surface of the polarizer and including a product obtained by curing a curable resin composition, a protective film provided on the other surface of the polarizer, and a pressure-sensitive adhesive layer provided on the outer side of the protective layer (Patent Document 2). The pressure-sensitive-adhesive-layer-attached polarizing films described in Patent Documents 1 and 2 are effective in terms of suppressing the occurrence of through cracks. In addition, polarizers have also been reduced in thickness. For example, it is proposed to provide a thin polarizer having controlled optical properties including a controlled single-body transmittance and a controlled degree of polarization and also having high orientation (Patent Document 3).

PRIOR ART DOCUMENTS

Patent Documents

Patent Document 1: JP-A-2010-009027
Patent Document 2: JP-A-2013-160775
Patent Document 3: JP-B1-4751481

SUMMARY OF THE INVENTION

Problems to be Solved by the Invention

Patent Documents 1 and 2 disclose that a reduction in thickness is achieved by using a one-side-protected polarizing film having a protective film on only one surface of a polarizer, while a protective layer is provided to suppress the occurrence of through cracks in the direction of the absorption axis of the polarizer, which would otherwise be caused by the use of the one-side-protected polarizing film.

On the other hand, polarizers have also been reduced in thickness. When a thinner polarizer is used to form a polarizing film or a pressure-sensitive-adhesive-layer-attached polarizing film, changes in shrinkage stress in the polarizer become smaller. Therefore, it has been found that the use of a thinner polarizer makes it possible to suppress the occurrence of through cracks.

However, it has been found that even through the occurrence of through cracks is suppressed in a one-side-protected polarizing film or a pressure-sensitive-adhesive-layer-attached polarizing film produced therewith, extremely-fine partial cracks (hereafter also referred to as nano-slits) can occur in the absorption axis direction of the polarizer when the optical properties are controlled and the polarizer used is thin (e.g., 10 μm or less in thickness) as described in Patent Document 3, and mechanical shock is applied to the one-side-protected polarizing film or the pressure-sensitive-adhesive-layer-attached polarizing film produced therewith (including a case where a load is applied to the polarizer side by downward bending). It has also been found that the nano-slits can occur regardless of the polarizing film size. It has also been found that the nano-slits do not occur when a double-side-protected polarizing film is used, which includes a polarizer and protective films on both surfaces of the polarizer. It has also been found that when a through crack occurs in a polarizer, any other through crack will not occur adjacent to the through crack because the stress around the through crack is released, and that in contrast, not only a nano-slit can occur alone but also nano-slits can occur adjacent to each other. It has also been found that a through crack once formed in a polarizer has the ability to progressively extend in the absorption axis direction of the polarizer, and that in contrast, nano-slits have no ability to progressively extend. Thus, it has been found that the nano-slit is a new problem that occurs when a thin polarizer with optical properties controlled within specific ranges is used to form a one-side-protected polarizing film in which the occurrence of through cracks is suppressed, and that the nano-slit is a problem caused by a phenomenon different from that responsible for the through crack.

In addition, the nano-slits, which are extremely fine, cannot be detected in a normal environment. Therefore, even if nano-slits occur in a polarizer, light leakage defects in the one-side-protected polarizing film or the pressure-sensitive-adhesive-layer-attached polarizing film produced therewith are difficult to find by only a glance. In other words, nano-slits are difficult to detect by automatic optical inspection, which is generally used for defect inspection of a one-side-protected polarizing film being produced in the form of a long strip. It has also been found that when one-side-protected polarizing films or pressure-sensitive-adhesive-layer-attached polarizing films are bonded to the glass substrates or other components of an image display panel and then placed in a heated environment, nano-slits can expand in the widthwise direction, so that nano-slit-induced defects can be detected (e.g., as the presence or absence of light leakage).

Thus, it is desired to suppress not only through cracks but also nano-slit-induced defects in a one-side-protected polarizing film having a thin polarizer or a pressure-sensitive-adhesive-layer-attached polarizing film produced therewith. In addition, a one-side-protected polarizing film or a pressure-sensitive-adhesive-layer-attached polarizing film produced therewith, which is thinner than a double-side-protected polarizing film having protective films on both sides, can easily buckle or break during handling. Therefore, such a polarizing film or a pressure-sensitive-adhesive-layer-attached polarizing film produced therewith is desired to be prevented from curling during handling. When a protective layer-attached one-side-protected polarizing film is produced by forming a protective layer on a one-side-protected polarizing film through solidification or curing, stress can easily accumulate between the polarizer and the protective layer due to the shrinkage of the protective layer-forming material during the formation of the protective layer, so that the protective layer-attached one-side-protected polarizing film can easily curl. In view of handling, therefore, a one-side-protected polarizing film or a pressure-sensitive-adhesive-layer-attached polarizing film produced therewith is desired not to undergo curling.

It is an object of the invention to provide a one-side-protected polarizing film that includes a thin polarizer with desired optical properties and a protective film provided on only one surface of the polarizer and is capable of suppressing the occurrence of through cracks, nano-slit-induced defects, and curling. It is another object of the invention to provide a pressure-sensitive-adhesive-layer-attached polarizing film including such a one-side-protected polarizing film and a pressure-sensitive adhesive layer.

It is a further object of the invention to provide an image display device having such a one-side-protected polarizing film or such a pressure-sensitive-adhesive-layer-attached polarizing film and to provide a method for continuously producing such an image display device.

Means for Solving the Problems

As a result of intensive studies, the inventors have accomplished the invention based on findings that the problems can be solved by the one-side-protected polarizing film, the pressure-sensitive-adhesive-layer-attached polarizing film, and other means described below.

That is, the present invention relates to a one-side-protected polarizing film, comprising:
a polarizer; and
a protective film or films provided on only one surface of the polarizer, wherein
the polarizer comprises a polyvinyl alcohol-based resin and is designed to have a single-body transmittance T and a polarization degree P representing optical properties satisfying the condition of the following formula: $P > -(10^{0.929T-42.4}-1) \times 100$ (provided that $T < 42.3$) or $P \geq 99.9$ (provided that $T \geq 42.3$), and
the polarizer and a transparent resin layer have a thickness X (μm) and a thickness Y (μm), respectively, satisfying $X \leq 12$, $Y \leq 15$, and $0.15 \leq (Y/X) \leq 3$.

In the one-side-protected polarizing film, the transparent resin layer preferably has an 80° C. compressive elastic modulus of 0.1 GPa or more.

In the one-side-protected polarizing film, the transparent resin layer preferably is made from an ultraviolet-curable acryl-based resin, an ultraviolet-curable epoxy-based resin, a urethane-based resin, or a polyvinyl alcohol-based resin.

The one-side-protected polarizing film preferably has further an adhesive layer between the polarizer and the protective film. The adhesive layer preferably has a thickness of 0.1 μm to 5 μm. Further, the adhesive layer preferably has an 80° C. compressive elastic modulus of 0.1 GPa to 10 GPa. Further, the adhesive layer is made from an ultraviolet-curable acryl-based resin, an ultraviolet-curable epoxy-based resin, a urethane-based resin, or a polyvinyl alcohol-based resin.

The one-side-protected polarizing film may have a single protective film. In this case, the protective film preferably has a thickness of 10 μm to 100 μm.

The one-side-protected polarizing film may have two protective films. In this case, each protective film preferably has a thickness of 10 μm or more, the protective films preferably have a total thickness of 100 μm or less, and an adhesive layer or a pressure-sensitive adhesive layer is preferably provided between the respective protective films.

In the one-side-protected polarizing film, the polarizer preferably contains 25% by weight or less of boric acid based on the total weight of the polarizer.

Further, the present invention relates to a pressure-sensitive-adhesive-layer-attached polarizing film comprising: the one-side-protected polarizing film; and a pressure-sensitive adhesive layer.

In the pressure-sensitive-adhesive-layer-attached polarizing film, the pressure-sensitive adhesive layer preferably has a thickness of 1 μm to 40 μm. The pressure-sensitive adhesive layer preferably has a storage modulus of $1.0 \times 10^4$ Pa or more at 23° C.

The pressure-sensitive-adhesive-layer-attached polarizing film may be used in such a form that the pressure-sensitive adhesive layer is provided on the transparent resin layer of the one-side-protected polarizing film. Alternatively, the pressure-sensitive-adhesive-layer-attached polarizing film may be used in such a form that the pressure-sensitive adhesive layer is provided on the protective film of the one-side-protected polarizing film. A separator may also be provided on the pressure-sensitive adhesive layer of the pressure-sensitive-adhesive-layer-attached polarizing film. The pressure-sensitive-adhesive-layer-attached polarizing film provided with the separator can be used in the form of a roll.

Further, the present invention relates to an image display device comprising the one-side-protected polarizing film or the pressure-sensitive-adhesive-layer-attached polarizing film.

Further, the present invention relates to a method for continuously producing an image display device, the method comprising the steps of:

unwinding the pressure-sensitive-adhesive-layer-attached polarizing film from the roll of the pressure-sensitive-adhesive-layer-attached polarizing film;

feeding the pressure-sensitive-adhesive-layer-attached polarizing film with the separator; and continuously bonding the pressure-sensitive-adhesive-layer-attached polarizing film to a surface of an image display panel with the pressure-sensitive adhesive layer interposed therebetween.

Effect of the Invention

The one-side-protected polarizing film and the pressure-sensitive-adhesive-layer-attached polarizing film of the invention include a polarizer with a thickness of 12 μm or less and are made thin. The thin polarizer with a thickness of 12 μm or less resists the occurrence of through cracks because changes in the shrinkage stress applied to the polarizer by thermal shock are smaller in the thin polarizer than in thick polarizers.

On the other hand, nano-slits are more likely to occur in thin polarizers having specific optical properties. Nano-slits seem to occur when mechanical shock is applied to the one-side-protected polarizing film or the pressure-sensitive-adhesive-layer-attached polarizing film produced therewith, in the process of producing the one-side-protected polarizing film, in the process of producing the pressure-sensitive-adhesive-layer-attached polarizing film by forming a pressure-sensitive adhesive layer on the one-side-protected polarizing film, or various processes after the production of the pressure-sensitive-adhesive-layer-attached polarizing film. Nano-slits are assumed to be caused by a mechanism different from that responsible for through cracks caused by thermal shock. In addition, when one-side-protected polarizing films or pressure-sensitive-adhesive-layer-attached polarizing films are bonded to the glass substrates or other components of an image display panel and then placed in a heated environment, nano-slits can expand in the widthwise direction, so that nano-slit-induced defects can be detected (e.g., as the presence or absence of light leakage).

In the one-side-protected polarizing film of the invention and the pressure-sensitive-adhesive-layer-attached polarizing film of the invention, the transparent resin layer provided on the other surface of the polarizer (the surface of the polarizer opposite to its surface provided with the protective film) can suppress the occurrence of defects due to the expansion of nano-slits in the widthwise direction even if the nano-slits occur in the polarizer of a one-side-protected polarizing film obtained before the formation of the transparent resin layer. The transparent resin layer is particularly effective when having an 80° C. compressive elastic modulus of 0.1 GPa or more.

As described above, the one-side-protected polarizing film of the invention and the pressure-sensitive-adhesive-layer-attached polarizing film produced therewith have a transparent resin layer that makes it possible to reduce the thickness to a satisfactory level and to allow the polarizer to resist the occurrence of through cracks and nano-slit-induced defects.

In the one-side-protected polarizing film of the invention and the pressure-sensitive-adhesive-layer-attached polarizing film of the invention, the thin polarizer and the transparent resin layer are designed to have a thickness X (μm) and a thickness Y (μm), respectively, satisfying X≤12, Y≤15, and 0.15≤(Y/X)≤3, which makes it possible to suppress curing in spite of the presence of the transparent resin layer capable of suppressing the occurrence of through cracks and nano-slit-induced defects in the polarizer.

BRIEF DESCRIPTION OF THE DRAWINGS

FIGS. 4A to 4E are exemplary photographs of cross-sections of one-side-protected polarizing films, which show the presence or absence of a nano-slit and show that heating-induced expansion of a nano-slit differs depending on the presence or absence of a transparent resin layer.

MODE FOR CARRYING OUT THE INVENTION

Figure 1A:
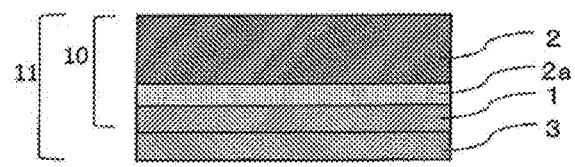
FIGS. 1A and 1B are schematic cross-sectional views of examples of the one-side-protected polarizing film of the invention.
Figure 1B:
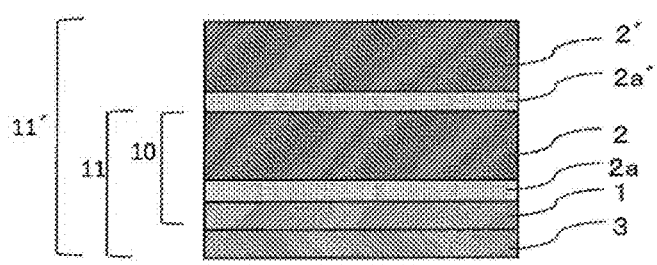

Hereinafter, the one-side-protected polarizing film 11 of the invention and the pressure-sensitive-adhesive-layer-attached polarizing film 12 of the invention will be described with reference to FIGS. 1 and 2. As illustrated in FIG. 1, a one-side-protected polarizing film 10 (without any transparent resin layer 3) includes, for example, a polarizer 1 and a protective film 2 on only one surface of the polarizer 1. An adhesive layer 2a (or any other intervening layer such as a pressure-sensitive adhesive layer, or an undercoat layer (primer layer)) is provided between the polarizer 1 and the protective film 2 stacked on each other. Although not shown, an adhesion facilitating layer or an activation treatment may be formed or performed on the protective film 2 of the one-side-protected polarizing film 10, and the adhesion facilitating layer and an adhesive layer may be stacked on each other. As illustrated in FIG. 1, the one-side-protected polarizing film 11 of the invention (with a transparent resin layer 3) includes the one-side-protected polarizing film 10 and a transparent resin layer 3 provided (directly) on one surface of the polarizer 1 (the surface opposite to its surface on which the protective film 2 is provided). As illustrate in FIG. 1B, a plurality of protective films 2 may be provided. FIG. 1B illustrates a one-side-protected polarizing film (with a transparent resin layer) 11' having two protective films 2 and 2'. An adhesive layer 2a (or any other intervening layer such as a pressure-sensitive adhesive layer or an undercoat layer (primer layer)) may be used to laminate the protective films 2 and 2'.

As stated above, the polarizer and the transparent resin layer are designed to have a thickness X (μm) and a thickness Y (μm), respectively, satisfying X≤12, Y≤15, and 0.15≤(Y/X)≤3. The value (Y/X) is preferably 0.24 or more in order to suppress defects caused by nano-slits occurring in the polarizer. The value (Y/X) is preferably 0.8 or less, more preferably 0.5 or less, in order to suppress curling. The value (Y/X) preferably satisfies 0.24≤(Y/X)≤0.8, more preferably 0.24≤(Y/X)≤0.5.

Figure 2A:
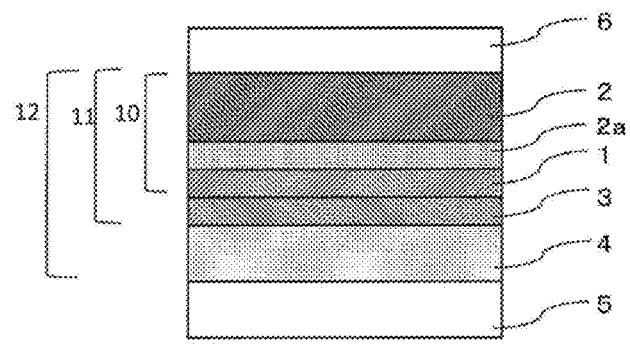
FIGS. 2A and 2B are schematic cross-sectional views of examples of the pressure-sensitive-adhesive-layer-attached polarizing film of the invention.
Figure 2B:
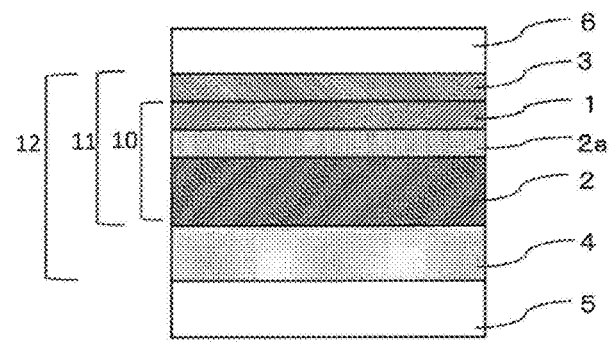

As illustrated in FIGS. 2A and 2B, the pressure-sensitive-adhesive-layer-attached polarizing film 12 of the invention includes the one-side-protected polarizing film 11 (with a transparent resin layer) and a pressure-sensitive adhesive layer 4. The pressure-sensitive adhesive layer 4 may be provided on the transparent resin layer 3 as illustrated in FIG. 2A or on the protective film 2 as illustrated in FIG. 2B. In addition, a separator 5 may be provided on the pressure-sensitive adhesive layer 4 of the pressure-sensitive-adhesive-layer-attached polarizing film 12 of the invention, and a surface protective film 6 may be provided on the opposite side of the film 12 from the separator 5. FIGS. 2A and 2B show cases where the separator 5 and the surface protective film 6 are both provided on the pressure-sensitive-adhesive-layer-attached polarizing film 12. The pressure-sensitive-adhesive-layer-attached polarizing film 12 provided with at least the separator 5 (and optionally further provided with the surface protective film 6) may be used in the form of a roll. As described below, for example, the roll is advantageously used in a process that includes unwinding the pressure-sensitive-adhesive-layer-attached polarizing film 12 from the roll, feeding the film 12 on the separator 5, and bonding the film 12 to the surface of an image display panel with the pressure-sensitive adhesive layer 4 interposed therebetween (hereinafter, such a method will also be referred to as a "roll-to-panel process", which is typically disclosed in JP-B1-4406043). The pressure-sensitive-adhesive-layer-attached polarizing film preferably has the structure shown in FIG. 2A, for example, in order to suppress warpage of the display panel after the bonding and to suppress the occurrence of nano-slits. The surface protective film 6 may be provided on the one-side-protected polarizing film 10 and on the one-side-protected polarizing film 11 (with a transparent resin layer). FIGS. 2A and 2B illustrate examples using the one-side-protected polarizing film (with a transparent resin layer) 11 of FIG. 1A. Alternatively, the one-side-protected polarizing film (with a transparent resin layer) 11' of FIG. 1B may also be used.

Figure 3A:
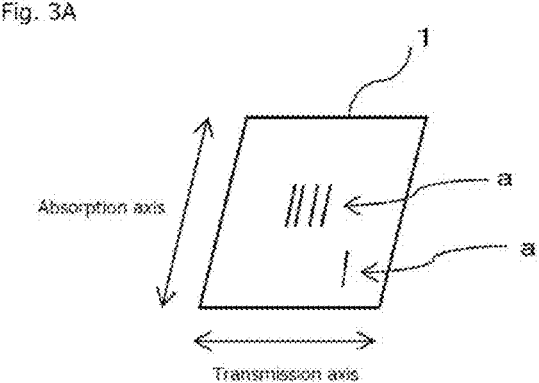
FIGS. 3A and 3B are exemplary schematic diagrams for a comparison between a nano-slit and a through crack occurring in a polarizer.
Figure 3B:
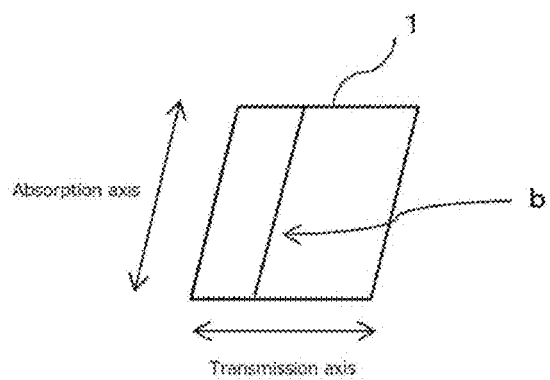

FIGS. 3A and 3B are schematic diagrams for comparing a nano-slit a and a through crack b, which can occur in the polarizer. FIG. 3A shows nano-slits a occurring in the polarizer 1, and FIG. 3B shows a through crack b occurring in the polarizer 1. The nano-slits a are caused by mechanical shock and partially occur in the direction of the absorption axis of the polarizer 1. The nano-slits a cannot be observed at the beginning of their formation, but become observable as they expand in the widthwise direction in a hot environment (e.g., at 80° C. or 60° C. and 90% RH). On the other hand, the nano-slits a are not considered to have the ability to progressively extend in the direction of the absorption axis of the polarizer. In addition, the nano-slits a are considered to occur regardless of the size of the polarizing film. Not only a single nano-slit a can occur alone, but also nano-slits a can occur adjacent to one another. On the other hand, the through crack b is caused by thermal shock (e.g., in a heat shock test). The through crack has the ability to progressively extend in the direction of the absorption axis of the polarizer, where the crack occurs. When a through crack b occurs, any other through crack will not occur adjacent thereto because the stress around it is released.

FIGS. 4A to 4E are exemplary photographs of the cross-section of the one-side-protected polarizing film 10 or the transparent resin layer-attached one-side-protected polarizing film 11 for showing the occurrence, expansion, and repair of a nano-slit a in the polarizer. FIG. 4A shows an example where no nano-slit occurs in a one-side-protected polarizing film 10 including a polarizer 1 and a protective film 2 on only one surface of the polarizer 1 with an adhesive layer 2a interposed therebetween. FIG. 4B shows an example where a nano-slit a occurs in the one-side-protected polarizing film 10. FIGS. 4A and 4B are both taken before heating. FIG. 4C is an exemplary photograph taken after heating of the cross-section of the one-side-protected polarizing film 10 in which a nano-slit a occurs. FIG. 4C shows that due to heating, the nano-slit a expands in the polarizer 1. On the other hand, FIG. 4D is an exemplary photograph of the cross-section taken of the transparent resin layer-attached one-side-protected polarizing film 11 obtained by forming a transparent resin layer 3 on the one-side-protected polarizing film 10 having the nano-slit a. FIG. 4D shows that the nano-slit a in the polarizer 1 is repaired (a') by the transparent resin layer 3. FIG. 4E is an exemplary photograph of the cross-section of the transparent resin layer-attached one-side-protected polarizing film 11 that has the transparent resin layer 3 and is obtained after heating. FIG. 4E shows that the repaired nano-slit (a') does not expand after heating. FIGS. 4A to 4E are each obtained by cutting the cross-section of a sample perpendicularly to the direction of the absorption axis of the sample using a cross-section polisher or a microtome and then observing the cross-section with a scanning electron microscope.

<Polarizer>

In the invention, the polarizer used has a thickness of 12 μm or less. In order to reduce the thickness and suppress the occurrence of through cracks, the thickness of the polarizer is preferably 10 μm or less, more preferably 8 μm or less, even more preferably 7 μm or less, still more preferably 6 μm or less. On the other hand, the thickness of the polarizer is preferably 2 μm or more, more preferably 3 μm or more. The polarizer with such a small thickness is less uneven in thickness, has good visibility, and is less dimensionally-variable and thus has high durability to thermal shock.

The polarizer used includes a polyvinyl alcohol-based resin. For example, the polarizer may be a product produced by a process including adsorbing a dichroic material such as iodine or a dichroic dye to a hydrophilic polymer film such as a polyvinyl alcohol-based film, a partially-formalized polyvinyl alcohol-based film, or a partially-saponified, ethylene-vinyl acetate copolymer-based film and uniaxially stretching the film, or may be a polyene-based oriented film such as a film of a dehydration product of polyvinyl alcohol or a dehydrochlorination product of polyvinyl chloride. Among these polarizers, a polarizer including a polyvinyl alcohol-based film and a dichroic material such as iodine is preferred.

For example, a polarizer including a uniaxially-stretched polyvinyl alcohol-based film dyed with iodine can be produced by a process including immersing a polyvinyl alcohol film in an aqueous iodine solution to dye the film and stretching the film to 3 to 7 times the original length. If necessary, the film may also be immersed in an aqueous solution of potassium iodide or the like optionally containing boric acid, zinc sulfate, zinc chloride, or other materials. If necessary, the polyvinyl alcohol-based film may be further immersed in water for washing before it is dyed. If the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid, potassium iodide, or the like or in a water bath.

In view of stretching stability and optical durability, the polarizer preferably contains boric acid. In order to suppress the occurrence and expansion of through cracks and nano-slits, the content of boric acid in the polarizer is preferably 25% by weight or less, more preferably 20% by weight or less, even more preferably 18% by weight or less, furthermore preferably 16% by weight or less, based on the total weight of the polarizer. If the content of boric acid in the polarizer is more than 20% by weight, shrinkage stress in the polarizer can increase to make through cracks more likely to occur even when the thickness of the polarizer is controlled to 10 μm or less, which is not preferred. On the other hand, in view of the stretching stability and optical durability of the polarizer, the boron content is preferably 10% by weight or more, more preferably 12% by weight or more, based on the total weight of the polarizer.

Typical examples of the thin polarizer include the thin polarizers described in, for example, JP-B1-4751486, JP-B1-4751481, JP-B1-4815544, JP-B1-5048120, JP-B1-5587517, WO 2014/077599 A, and WO 2014/077636 A or thin polarizers obtained by the production methods described in these publications.

The polarizer is designed to have a single-body transmittance T and a polarization degree P that represent optical properties satisfying the condition of the following formula: $P > -(10^{0.929T-42.4}-1) \times 100$ (provided that T<42.3) or P≥99.9 (provided that T≥42.3). The polarizer designed to satisfy the condition uniquely has the performance required for a liquid crystal television display having a large display element. Specifically, such a display is required to have a contrast ratio of 1,000:1 or more and a maximum brightness of 500 cd/m$^2$ or more. In other applications, for example, the polarizer is bonded to the viewer side of an organic EL display device.

On the other hand, the polarizer designed to satisfy the condition includes a polymer (e.g., a polyvinyl alcohol-based molecule) having high orientation, which causes, together with the thickness of 10 μm or less, a significant reduction in the tensile rupture stress in the direction perpendicular to the absorption axis direction of the polarizer. This extremely increases the possibility that nano-slits may occur in the direction of the absorption axis of the polarizer, for example, when the polarizer is exposed to mechanical shock beyond the tensile rupture stress in the process of producing the polarizing film. Therefore, the invention is particularly suitable for providing a one-side-protected polarizing film including the polarizer described above (or providing a pressure-sensitive-adhesive-layer-attached polarizing film including the polarizer described above).

The thin polarizer described above should be produced by a process capable of achieving high-ratio stretching to improve polarizing performance, among processes including the steps of stretching and dyeing a laminate. From this point of view, the thin polarizer is preferably obtained by a process including the step of stretching in an aqueous boric acid solution as described in JP-B1-4751486, JP-B1-4751481, or JP-B1-4815544, and more preferably obtained by a process including the step of performing auxiliary in-air stretching before stretching in an aqueous boric acid solution as described in JP-B1-4751481 or JP-B1-4815544. These thin polarizers can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage by stretching, because the layer is supported on the stretchable resin substrate.

<Protective Film>

The protective film is preferably made of a material having a high level of transparency, mechanical strength, thermal stability, water barrier properties, isotropy, and other properties. Examples of such a material include polyester-based polymers such as polyethylene terephthalate and polyethylene naphthalate, cellulose-based polymers such as diacetyl cellulose and triacetyl cellulose, acryl-based polymers such as polymethyl methacrylate, styrene-based polymers such as polystyrene and acrylonitrile-styrene copolymers (AS resins), and polycarbonate-based polymers. Examples of polymers that may be used to form the protective film also include polyolefin-based polymers such as polyethylene, polypropylene, cyclo-based or norbornene-structure-containing polyolefin, and ethylene-propylene copolymers, vinyl chloride-based polymers, amide-based polymers such as nylon and aromatic polyamide, imide-based polymers, sulfone-based polymers, polyether sulfone-based polymers, polyether ether ketone-based polymers, polyphenylene sulfide-based polymers, vinyl alcohol-based polymers, vinylidene chloride-based polymers, vinyl butyral-based polymers, arylate-based polymers, polyoxymethylene-based polymers, epoxy-based polymers, or any blends of the above polymers.

The protective film may also contain any type of one or more appropriate additives. Examples of such additives include ultraviolet absorbers, antioxidants, lubricants, plasticizers, release agents, discoloration preventing agents, flame retardants, nucleating agents, antistatic agents, pigments, and colorants. The content of the thermoplastic resin in the protective film is preferably from 50 to 100% by weight, more preferably from 50 to 99% by weight, even more preferably from 60 to 98% by weight, further more preferably from 70 to 97% by weight. If the content of the thermoplastic resin in the protective film is 50% by weight or less, high transparency and other properties inherent in the thermoplastic resin may fail to be sufficiently exhibited.

The protective film may also be, for example, a retardation film, a brightness enhancement film, or a diffusion film. The retardation film may have an in-plane retardation of 40 nm or more and/or a thickness direction retardation of 80 nm or more. The in-plane retardation is generally adjusted to fall within the range of 40 to 200 nm, and the thickness direction retardation is generally adjusted to fall within the range of 80 to 300 nm. When a retardation film is used as the protective film, the retardation film can also serve as a polarizer protecting film, which contributes to thickness reduction.

The retardation film may be a birefringent film formed by subjecting a thermoplastic resin film to uniaxial or biaxial stretching. The stretching temperature, the stretch ratio, and other conditions may be appropriately selected depending on the retardation value, the film material, and the thickness.

The thickness of the protective film may be selected as needed. In general, the thickness of the protective film is from about 1 to about 500 μm in view of strength, workability such as handleability, and thin layer formability. In particular, the thickness of the protective film is preferably from 1 to 300 µm, more preferably from 5 to 200 µm. Particularly when a single protective film is used (the protective film is one sheet), the thickness of the protective film is preferably 100 µm or less, more preferably 80 µm or less, even more preferably 60 µm or less for thickness reduction. In order to protect the polarizing film from buckling and breaking, the thickness of the protective film is preferably 10 µm or more, more preferably 20 µm or more. In order for the polarizer to resist buckling under mechanical stress on the polarizing film, the protective film, the polarizer, and the transparent resin layer preferably satisfy the relation $4X \leq (Y+V)$, more preferably satisfy the relation $5X \leq (Y+V)$, wherein V is the thickness (µm) of the protective film, X is the thickness (µm) of the polarizer, and Y is the thickness (µm) of the transparent resin layer.

Two protective films may also be used together (the protective films may also be two sheets). In order to protect the polarizing film from buckling and breaking, the two protective films each preferably have a total thickness of 10 µm or more, more preferably 20 µm or more. In order to reduce the thickness of the one-side-protected polarizing film, the two protective films preferably have a total thickness of 100 µm or less.

The surface of the protective film, opposite to its surface where the polarizer is bonded (particularly in the mode shown in FIG. 1), may be provided with a functional layer such as a hard coat layer, an anti-reflection layer, an anti-sticking layer, a diffusion layer, or an antiglare layer. The functional layer such as a hard coat layer, an anti-reflection layer, an anti-sticking layer, a diffusion layer, or an antiglare layer may be provided as part of the protective film itself or as a layer independent of the protective film.

<Intervening Layer>

The protective film and the polarizer are laminated with an intervening layer, such as an adhesive layer, a pressure-sensitive adhesive layer, or an undercoat layer (primer layer), between them. In this case, the intervening layer should preferably be used to laminate them with no air gap between them. The protective film and the polarizer are preferably laminated with an adhesive layer interposed therebetween.

The adhesive layer is made from an adhesive. Any of various types of adhesives may be used. The adhesive layer may be of any optically-transparent type. The adhesive may be any of various types, such as a water-based adhesive, a solvent-based adhesive, a hot melt-based adhesive, and an active energy ray-curable adhesive. A water-based adhesive or an active energy ray-curable adhesive is preferred.

The water-based adhesive may be, for example, an isocyanate-based adhesive, a polyvinyl alcohol-based adhesive, a gelatin-based adhesive, a vinyl-based adhesive, a latex-based adhesive, or a water-based polyester adhesive. The water-based adhesive is generally used in the form of an aqueous solution, which generally has a solids content of 0.5 to 60% by weight. Particularly preferred are an isocyanate-based adhesive and a polyvinyl alcohol-based adhesive. A urethane-based resin layer can be formed as the adhesive layer from an isocyanate-based adhesive.

The active energy ray-curable adhesive is an adhesive capable of being cured by exposure to active energy rays such as electron beams or ultraviolet rays (a radically or cationically curable adhesive). The active energy ray-curable adhesive to be used may be of, for example, an electron beam-curable type or an ultraviolet-curable type. The active energy ray-curable adhesive may be, for example, a photo-radically curable adhesive. The photo-radically curable type active energy ray-curable adhesive may be of an ultraviolet-curable type. In this case, the adhesive should contain a radically polymerizable compound and a photopolymerization initiator. For example, an ultraviolet-curable acryl-based resin is preferred for the radically-curable, ultraviolet-curable adhesive, and an ultraviolet-curable epoxy-based resin is preferred for the cationically-curable, ultraviolet-curable adhesive.

The method for applying the adhesive is appropriately selected depending on the viscosity of the adhesive and the desired thickness. Examples of application means include a reverse coater, a gravure coater (direct, reverse, or offset), a bar reverse coater, a roll coater, a die coater, a bar coater, and a rod coater. Any other suitable application method such as dipping may also be used.

The thickness of the adhesive layer is preferably from 0.1 µm to 5 µm. The preferred range of the thickness of the adhesive layer can be selected depending on the type of the water-based adhesive or the active energy ray-curable adhesive. In order to maintain the level of adhering strength, the thickness is preferably 0.1 µm or more. In order to ensure optical reliability, the thickness is preferably 5 µm or less. When the water-based adhesive or the like is used, the adhesive is preferably applied so as to finally form an adhesive layer with a thickness of 100 to 300 nm. The thickness of the adhesive layer is more preferably from 100 to 250 nm. On the other hand, when the active energy ray-curable adhesive is used, the adhesive layer is preferably formed with a thickness of 0.2 to 5 µm. The thickness is more preferably from 0.2 to 2 µm, even more preferably from 0.5 to 1.5 µm.

In order to relieve the force on the polarizer and to suppress through cracks, the adhesive layer preferably has an 80° C. compressive elastic modulus of 0.1 GPa to 10 GPa. The adhesive layer preferably has a compressive elastic modulus of 0.1 GPa or more in order to absorb shock and to provide reliable crack resistance (or to suppress the occurrence of nano-slits and through cracks). The adhesive layer preferably has a compressive elastic modulus of 10 GPa or less in order to suppress through cracks, which would otherwise occur when the shrinkage of the polarizer cannot be suppressed. In particular, the compressive elastic modulus of the adhesive layer made from the active energy ray-curable adhesive is preferably 1 GPa or more, more preferably 3 GPa or more. On the other hand, the compressive elastic modulus is preferably 8 GPa or less.

In the process of laminating the polarizer and the protective film, an adhesion-facilitating layer may be placed between the protective film and the adhesive layer. The adhesion-facilitating layer may be made of, for example, any of various resins having a polyester skeleton, a polyether skeleton, a polycarbonate skeleton, a polyurethane skeleton, a silicone skeleton, a polyamide skeleton, a polyimide skeleton, a polyvinyl alcohol skeleton, or other polymer skeletons. These polymer resins may be used singly or in combination of two or more. Other additives may also be added to form the adhesion-facilitating layer. More specifically, a tackifier, an ultraviolet absorber, an antioxidant, or a stabilizer such as a heat-resistant stabilizer may also be used to form the adhesion-facilitating layer.

The adhesion-facilitating layer is usually provided in advance on the protective film, and then the adhesion-facilitating layer side of the protective film is bonded to the polarizer with the adhesive layer. The adhesion-facilitating layer can be formed using a known technique that includes applying an adhesion-facilitating-layer-forming material onto the protective film and drying the material. The adhesion-facilitating-layer-forming material is generally prepared in the form of a solution which is diluted to a suitable concentration taking into account the coating thickness after drying, the smoothness of the application, and other factors. After dried, the adhesion-facilitating layer preferably has a thickness of 0.01 to 5 μm, more preferably 0.02 to 2 μm, even more preferably 0.05 to 1 μm. Two or more adhesion-facilitating layers may be provided. Also in this case, the total thickness of the adhesion-facilitating layers preferably falls within these ranges.

The pressure-sensitive adhesive layer is made from a pressure-sensitive adhesive. Any of various pressure-sensitive adhesives may be used, examples of which include rubber-based pressure-sensitive adhesives, acryl-based pressure-sensitive adhesives, silicone-based pressure-sensitive adhesives, polyurethane-based pressure-sensitive adhesives, vinyl alkyl ether-based pressure-sensitive adhesives, polyvinylpyrrolidone-based pressure-sensitive adhesives, polyacrylamide-based pressure-sensitive adhesives, and cellulose-based pressure-sensitive adhesives. The base polymer with adhesive properties is selected depending on the type of the pressure-sensitive adhesive. Among these pressure-sensitive adhesives, acryl-based pressure-sensitive adhesives are preferably used because they have a high level of optical transparency, weather resistance, heat resistance, and other properties, and exhibit an appropriate level of wettability and adhesive properties including cohesiveness and adhesiveness.

The undercoat layer (primer layer) is formed to improve the adhesion between the polarizer and the protective film. The primer layer may be made of any material capable of providing somewhat strong adhesion to both the base film and a polyvinyl alcohol-based resin layer. For example, a thermoplastic resin having a high level of transparency, thermal stability, and stretchability may be used to form the primer layer. Such a thermoplastic resin may be, for example, an acryl-based resin, a polyolefin-based resin, a polyester-based resin, a polyvinyl alcohol-based resin, or any mixture thereof.

When at least two protective films are used as mentioned above, the protective films are preferably laminated with an adhesive layer or a pressure-sensitive adhesive layer interposed between the respective protective films. In view of adhering strength, the adhesive layer preferably has a thickness of 0.1 μm or more, more preferably 0.2 μm or more. On the other hand, for thickness reduction, the adhesive layer preferably has a thickness of 5 μm or less, more preferably 2 μm or less. When a pressure-sensitive adhesive is used to laminate the respective protective films, the thickness of the pressure-sensitive adhesive layer is preferably 2 m or more μm view of adhesive strength. On the other hand, the thickness of the pressure-sensitive adhesive layer is preferably 20 μm or less for thickness reduction.

<Transparent Resin Layer>

The one-side-protected polarizing film including the polarizer and the protective film or films provided on only one surface of the polarizer has a transparent resin layer provided on the other surface of the polarizer (the surface opposite to the surface on which the protective film or films are placed). In the invention, the transparent resin layer preferably has an 80° C. compressive elastic modulus of 0.1 GPa or more. Even if nano-slits occur in the polarizer due to mechanical shock and are capable of expanding in the widthwise direction in a hot environment, the transparent resin layer with a controlled 80° C. compressive elastic modulus of 0.1 GPa or more can maintain the ability to withstand mechanical loads even in a hot environment and thus can suppress the expansion of the nano-slits in the widthwise direction. The compressive elastic modulus of the transparent resin layer is preferably 0.5 GPa or more, more preferably 2 GPa or more, even more preferably 3 GPa or more, further more preferably 5 GPa or more, still more preferably 6 GPa or more, yet more preferably 10 GPa or more. The compressive elastic modulus of the transparent resin layer can be controlled by selecting the material. In this regard, the 80° C. compressive elastic modulus of the transparent resin layer is the value measured by the method described in the EXAMPLES section.

In view of thickness reduction and optical reliability, the transparent resin layer has a thickness (Y) of 15 μm or less. As the transparent resin layer increases in thickness, the one-side-protected polarizing film becomes more likely to curl after storage. The thickness (Y) of the transparent resin layer is more preferably 12 μm or less, even more preferably 5 μm or less, further more preferably 1.5 μm or less. On the other hand, in view of the effect of suppressing the expansion of nano-slits, the thickness (Y) of the transparent resin layer is preferably 0.2 μm or more, more preferably 0.5 μm or more, even more preferably 0.6 μm or more, further more preferably 0.8 μm or more. The thickness (Y) of the transparent resin layer is controlled to satisfy $0.15 \leq (Y/X) \leq 3$ in relation to the thickness X (μm) of the polarizer.

The transparent resin layer can be formed from a curable, layer-forming material containing a curable component. The curable component can be broadly classified into an active energy ray-curable type such as an electron beam-curable type, an ultraviolet-curable type, or a visible light-curable type; and a thermosetting type. The ultraviolet-curable type and the visible light-curable type can be further classified into a radically polymerizable curable type and a cationically polymerizable curable type. In the invention, active energy rays in the wavelength range of 10 nm to less than 380 nm are called ultraviolet rays or ultraviolet light, and active energy rays in the wavelength range of 380 nm to 800 nm are called visible rays or visible light. The curable component of the radically polymerizable curable material can be used as a thermosetting curable component.

<<Radically Polymerizable, Curable, Layer-Forming Material>>

Examples of the curable component include radically polymerizable compounds. Radically polymerizable compounds include compounds having a radically-polymerizable carbon-carbon double bond-containing functional group, such as a (meth)acryloyl group or a vinyl group. The curable component may be any of a monofunctional radically polymerizable compound or a bifunctional or polyfunctional radically polymerizable compound. These radically polymerizable compounds may be used singly or in combination of two or more. These radically polymerizable compounds are preferably, for example, (meth)acryloyl group-containing compounds. In the invention, the term "(meth)acryloyl" means acryloyl and/or methacryloyl, and hereinafter, "(meth)" is used in the same meaning.

<<Monofunctional Radically Polymerizable Compound>>

The monofunctional radically polymerizable compound may be, for example, a (meth)acrylamide derivative having a (meth)acrylamide group. The (meth)acrylamide derivative is preferable in order to ensure the adhesion to the polarizer and in terms of having high polymerization rate and providing high productivity. Examples of the (meth)acrylamide derivative include N-alkyl group-containing (meth)acrylamide derivatives such as N-methyl(meth)acrylamide, N,N- dimethyl(meth)acrylamide, N,N-diethyl(meth)acrylamide, N-isopropyl(meth)acrylamide, N-butyl(meth)acrylamide, and N-hexyl(meth)acrylamide; N-hydroxyalkyl group-containing (meth)acrylamide derivatives such as N-methylol (meth)acrylamide, N-hydroxyethyl(meth)acrylamide, and N-methylol-N-propane(meth)acrylamide; N-aminoalkyl group-containing (meth)acrylamide derivatives such as aminomethyl(meth)acrylamide and aminoethyl(meth)acrylamide; N-alkoxy group-containing (meth)acrylamide derivatives such as N-methoxymethylacrylamide and N-ethoxymethylacrylamide; and N-mercaptoalkyl group-containing (meth)acrylamide derivatives such as mercaptomethyl(meth)acrylamide and mercaptoethyl(meth)acrylamide. Heterocyclic ring-containing (meth)acrylamide derivatives in which the nitrogen atom of a (meth)acrylamide group forms a heterocyclic ring may also be used, such as N-acryloylmorpholine, N-acryloylpiperidine, N-methacryloylpiperidine, and N-acryloylpyrrolidine.

Among the (meth)acrylamide derivatives, N-hydroxyalkyl group-containing (meth)acrylamide derivatives are preferred in view of adhesion to the polarizer, and N-hydroxyethyl(meth)acrylamide is particularly preferred.

Examples of the monofunctional radically polymerizable compound also include various (meth)acrylic acid derivatives having a (meth)acryloyloxy group. Specific examples include (C1 to C20) alkyl (meth)acrylates such as methyl (meth)acrylate, ethyl (meth)acrylate, n-propyl (meth)acrylate, isopropyl (meth)acrylate, 2-methyl-2-nitropropyl (meth)acrylate, n-butyl (meth)acrylate, isobutyl (meth)acrylate, sec-butyl (meth)acrylate, tert-butyl (meth)acrylate, n-pentyl (meth)acrylate, tert-pentyl (meth)acrylate, 3-pentyl (meth)acrylate, 2,2-dimethylbutyl (meth)acrylate, n-hexyl (meth)acrylate, cetyl (meth)acrylate, n-octyl (meth)acrylate, 2-ethylhexyl (meth)acrylate, 4-methyl-2-propylpentyl (meth)acrylate, and n-octadecyl (meth)acrylate.

Examples of the (meth)acrylic acid derivatives also include cycloalkyl (meth)acrylates such as cyclohexyl (meth)acrylate and cyclopentyl (meth)acrylate; aralkyl (meth)acrylates such as benzyl (meth)acrylate; polycyclic (meth)acrylates such as 2-isobornyl (meth)acrylate, 2-norbornylmethyl (meth)acrylate, 5-norbornen-2-yl-methyl (meth)acrylate, 3-methyl-2-norbornylmethyl (meth)acrylate, dicyclopentenyl (meth)acrylate, dicyclopentenyloxyethyl (meth)acrylate and dicyclopentanyl (meth)acrylate; and alkoxy group- or phenoxy group-containing (meth)acrylates such as 2-methoxyethyl (meth)acrylate, 2-ethoxyethyl (meth)acrylate, 2-methoxymethoxyethyl (meth)acrylate, 3-methoxybutyl (meth)acrylate, ethylcarbitol (meth)acrylate, phenoxyethyl (meth)acrylate, and alkylphenoxy polyethylene glycol (meth)acrylate.

Examples of the (meth)acrylic acid derivatives also include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth) acrylate, 8-hydroxyoctyl (meth)acrylate, 10-hydroxydecyl (meth)acrylate, and 12-hydroxylauryl (meth)acrylate, and other hydroxy group-containing (meth)acrylates such as [4-(hydroxymethyl)cyclohexyl]methyl acrylate, cyclohexanedimethanol mono(meth)acrylate, and 2-hydroxy-3-phenoxypropyl (meth)acylate; epoxy group-containing (meth)acrylates such as glycidyl (meth)acrylate and 4-hydroxybutyl (meth)acrylate glycidyl ether; halogen-containing (meth)acrylates such as 2,2,2-trifluoroethyl (meth)acrylate, 2,2,2-trifluoroethylethyl (meth)acrylate, tetrafluoropropyl (meth)acrylate, hexafluoropropyl (meth)acrylate, octafluoropentyl (meth)acrylate, heptadecafluorodecyl (meth)acrylate, and 3-chloro-2-hydroxypropyl (meth) acrylate; alkylaminoalkyl (meth)acrylates such as dimethylaminoethyl (meth)acrylate; oxetane group-containing (meth)acrylates such as 3-oxetanylmethyl (meth)acrylate, 3-methyl-oxetanylmethyl (meth)acrylate, 3-ethyl-oxetanylmethyl (meth)acrylate, 3-butyl-oxetanylmethyl (meth)acrylate, and 3-hexyl-oxetanylmethyl (meth)acrylate; heterocyclic ring-containing (meth)acrylates such as tetrahydrofurfuryl (meth)acrylate and butyrolactone (meth)acrylate; and (meth)acrylic acid adducts of neopentyl glycol hydroxypivalate, and p-phenylphenol (meth)acrylate.

Examples of the monofunctional radically polymerizable compound also include carboxyl group-containing monomers such as (meth)acrylic acid, carboxyethyl acrylate, carboxypentyl acrylate, itaconic acid, maleic acid, fumaric acid, crotonic acid, and isocrotonic acid.

Examples of the monofunctional radically polymerizable compound also include vinyl lactam monomers such as N-vinylpyrrolidone, N-vinyl-ε-caprolactam, and methylvinylpyrrolidone; and vinyl monomers having a nitrogen-containing heterocyclic ring, such as vinylpyridine, vinylpiperidone, vinylpyrimidine, vinylpiperazine, vinylpyrazine, vinylpyrrole, vinylimidazole, vinyloxazole, and vinylmorpholine.

The monofunctional radically polymerizable compound may also be a radically polymerizable compound having an active methylene group. The radically polymerizable compound having an active methylene group should be a compound having an active double-bond group such as a (meth) acrylic group at its end or in its molecule and also having an active methylene group. The active methylene group may be, for example, an acetoacetyl group, an alkoxymalonyl group, or a cyanoacetyl group. The active methylene group is preferably an acetoacetyl group. Examples of the radically polymerizable compound having an active methylene group include acetoacetoxyalkyl (meth)acrylates such as 2-acetoacetoxyethyl (meth)acrylate, 2-acetoacetoxypropyl (meth)acrylate, and 2-acetoacetoxy-1-methylethyl (meth) acrylate; 2-ethoxymalonyloxyethyl (meth)acrylate, 2-cyanoacetoxyethyl (meth)acrylate, N-(2-cyanoacetoxyethyl) acrylamide, N-(2-propionylacetoxybutyl)acrylamide, N-(4-acetoacetoxymethylbenzyl)acrylamide, and N-(2-acetoacetylaminoethyl)acrylamide. The radically polymerizable compound having an active methylene group is preferably acetoacetoxyalkyl (meth)acrylate.

<<Polyfunctional Radically Polymerizable Compound>>

Examples of the bifunctional or polyfunctional radically polymerizable compound include tripropylene glycol di(meth)acrylate, tetraethylene glycol di(meth)acrylate, 1,6-hexanediol di(meth)acrylate, 1,9-nonanediol di(meth)acrylate, 1,10-decanediol diacrylate, 2-ethyl-2-butylpropanediol di(meth)acrylate, bisphenol A di(meth)acrylate, bisphenol A ethylene oxide adduct di(meth)acrylate, bisphenol A propylene oxide adduct di(meth)acrylate, bisphenol A diglycidyl ether di(meth)acrylate, neopentyl glycol di(meth)acrylate, tricyclodecanedimethanol di(meth)acrylate, cyclic trimethylolpropane formal (meth)acrylate, dioxaneglycol di(meth) acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, polyhydric alcohol esters of (meth)acrylic acid, such as EO-modified diglycerin tetra(meth)acrylate, and 9,9-bis[4-(2-(meth)acryloyloxyethoxy)phenyl]fluorene. Specific examples include Aronix M-220 and Aronix M-306 (manufactured by Toagosei Co., Ltd.), LIGHT ACRYLATE 1,9ND-A (manufactured by Kyoeisha Chemical Co., Ltd.), LIGHT ACRYLATE DGE-4A (manufactured by Kyoeisha Chemical Co., Ltd.), LIGHT ACRYLATE DCP-A (manufactured by Kyoeisha Chemical Co., Ltd.), SR-531 (manufactured by Sartomer), and CD-536 (manufactured by Sartomer). If necessary, various epoxy (meth)acrylates, urethane (meth)acrylates, polyester (meth)acrylates, or various (meth)acrylate-based monomers may also be used.

In order to achieve both good adhesion to the polarizer and good optical durability, the monofunctional radically polymerizable compound is preferably used in combination with the polyfunctional radically polymerizable compound. In general, 3 to 80% by weight of the monofunctional radically polymerizable compound is preferably used in combination with 20 to 97% by weight of the polyfunctional radially polymerizable compound based on 100% by weight of the radically polymerizable compounds.

<<Mode of Radically Polymerizable, Curable, Layer-Forming Material>>

The radically polymerizable, curable, layer-forming material to be used may be an active energy ray-curable, layer-forming material or a thermosetting, layer-forming material. When an electron beam is used as the active energy ray, the active energy ray-curable, layer-forming material does not have to contain a photopolymerization initiator, but when an ultraviolet or visible ray is used as the active energy ray, the active energy ray-curable, layer-forming material should preferably contain a photopolymerization initiator. On the other hand, when the curable component is used as a thermosetting component, the layer-forming material should preferably contain a thermal polymerization initiator.

<<Photopolymerization Initiator>>

The photopolymerization initiator for use with the radically polymerizable compound is appropriately selected depending on the type of the active energy ray. For curing with ultraviolet or visible light, an ultraviolet or visible light-cleavable photopolymerization initiator should be used.

Examples of the photopolymerization initiator include benzophenone-based compounds such as benzil, benzophenone, benzoylbenzoic acid, and 3,3'-dimethyl-4-methoxy-benzophenone; aromatic ketone compounds such as 4-(2-hydroxyethoxy)phenyl(2-hydroxy-2-propyl)ketone, α-hydroxy-α,α'-dimethylacetophenone, 2-methyl-2-hydroxypropiophenone, and α-hydroxycyclohexyl phenyl ketone; acetophenone-based compounds such as methoxyacetophenone, 2,2-dimethoxy-2-phenylacetophenone, 2,2-diethoxyacetophenone, and 2-methyl-1-[4-(methylthio)-phenyl]-2-morpholinopropane-1; benzoin ether-based compounds such as benzoin methyl ether, benzoin ethyl ether, benzoin isopropyl ether, benzoin butyl ether, and anisoin methyl ether; aromatic ketal-based compounds such as benzyl dimethyl ketal; aromatic sulfonyl chloride-based compounds such as 2-naphthalenesulfonyl chloride; optically active oxime-based compounds such as 1-phenone-1, 1-propanedione-2-(o-ethoxycarbonyl)oxime; thioxanthone-based compounds such as thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, and dodecylthioxanthone; camphorquinone; halogenated ketones; acylphosphine oxide; and acylphosphonate.

The content of the photopolymerization initiator should be 20 parts by weight or less based on 100 parts by weight of the total amount of the curable components (radically polymerizable compounds). The content of the photopolymerization initiator is preferably from 0.01 to 20 parts by weight, more preferably from 0.05 to 10 parts by weight, even more preferably from 0.1 to 5 parts by weight.

When the curable, layer-forming material used for the polarizing film of the invention is a visible light-curable, layer-forming material containing the radically polymerizable compound as the curable component, a photopolymerization initiator having high sensitivity particularly to light of 380 nm or longer is preferably used in the layer-forming material. The photopolymerization initiator having high sensitivity to light of 380 nm or longer will be described later.

A compound represented by formula (1):

[Formula. 1]

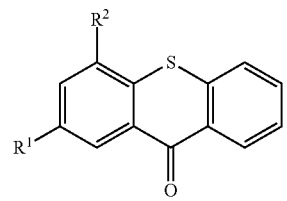

(1)

wherein $R^1$ and $R^2$ each represent —H, —$CH_2CH_3$, -i-Pr, or Cl, and $R^1$ and $R^2$ may be the same or different, is preferably used alone as the photopolymerization initiator or preferably used as the photopolymerization initiator in combination with another photopolymerization initiator having high sensitivity to light of 380 nm or longer described later. The resulting adhesion is higher when the compound of formula (1) is used than when a photopolymerization initiator having high sensitivity to light of 380 nm or longer is used alone. In particular, the compound of formula (1) is preferably diethyl thioxanthone in which $R^1$ and R are each —$CH_2CH_3$. The content of the compound of formula (1) in the layer-forming material is preferably from 0.1 to 5 parts by weight, more preferably from 0.5 to 4 parts by weight, even more preferably from 0.9 to 3 parts by weight, based on 100 parts by weight of the total amount of the curable components.

If necessary, a polymerization initiation aid is preferably added to the layer-forming material. In particular, the polymerization initiation aid is preferably triethylamine, diethylamine, N-methyldiethanolamine, ethanolamine, 4-dimethylaminobenzoic acid, methyl 4-dimethylaminobenzoate, ethyl 4-dimethylaminobenzoate, or isoamyl 4-dimethylaminobenzoate. Ethyl 4-dimethylaminobenzoate is particularly preferred. When the polymerization initiation aid is used, the content of the aid is generally 0 to 5 parts by weight, preferably 0 to 4 parts by weight, most preferably 0 to 3 parts by weight, based on 100 parts by weight of the total amount of the curable components.

If necessary, a known photopolymerization initiator may be used in combination. Since the protective film having the ability to absorb UV does not transmit light of 380 nm or shorter, such a photopolymerization initiator should preferably have high sensitivity to light of 380 nm or longer. Examples of such an initiator include 2-methyl-1-(4-methylthiophenyl)-2-morpholinopropan-1-one, 2-benzyl-2-dimethylamino-1-(4-morpholinophenyl)-butanone-1, 2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, and bis(η5-2,4-cyclopentadien-1-yl)-bis(2,6-difluoro-3-(1H-pyrrol-1-yl)-phenyl)titanium.

In particular, a compound represented by formula (2):

[Formula. 2]

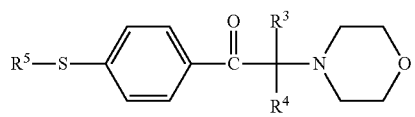
(2)

wherein $R^3$, $R^4$, and $R^5$ each represent —H, —CH$_3$, —CH$_2$CH$_3$, -i-Pr, or Cl, and $R^3$, $R^4$, and $R^5$ may be the same or different, is preferably used in addition to the photopolymerization initiator of formula (1). Commercially available 2-methyl-1-(4-methylthiophenyl)-2-morpholinopropan-1-one (IRGACURE 907 (trade name) manufactured by BASF) is preferably used as the compound of formula (2). Besides this, 2-benzyl-2-dimethylamino-1-(4-morpholinophenyl)-butanone-1 (IRGACURE 369 (trade name) manufactured by BASF) and 2-(dimethylamino)-2-[(4-methylphenyl)methyl]-1-[4-(4-morpholinyl)phenyl]-1-butanone (IRGACURE 379 (trade name) manufactured by BASF) are preferred because of their high sensitivity.

<Radically Polymerizable Compound Having Active Methylene Group and Radical Polymerization Initiator Having Hydrogen-Withdrawing Function>

The radically polymerizable compound used in the active energy ray-curable, layer-forming material may be a radically polymerizable compound having an active methylene group. In this case, the radically polymerizable compound is preferably used in combination with a radical polymerization initiator having a hydrogen-withdrawing function.

The radical polymerization initiator having a hydrogen-withdrawing function may be, for example, a thioxanthone radical polymerization initiator or a benzophenone radical polymerization initiator. The radical polymerization initiator is preferably a thioxanthone radical-based polymerization initiator. The thioxanthone radical-based polymerization initiator may be, for example, the compound of formula (1) shown above. Examples of the compound of formula (1) include thioxanthone, dimethyl thioxanthone, diethyl thioxanthone, isopropyl thioxanthone, and chlorothioxanthone. In particular, the compound of formula (1) is preferably diethyl thioxanthone in which $R^1$ and $R^2$ are each —CH$_2$CH$_3$.

When the active energy ray-curable, layer-forming material contains the radically polymerizable compound having an active methylene group and the radical polymerization initiator having a hydrogen-withdrawing function, the content of the radically polymerizable compound having an active methylene group is preferably from 1 to 50% by weight based on 100% by weight of the total amount of the curable components, and the content of the radical polymerization initiator is preferably from 0.1 to 10 parts by weight based on 100 parts by weight of the total amount of the curable components.

<<Thermal Polymerization Initiator>>

The thermal polymerization initiator is preferably such that it does not start undergoing thermal cleavage-induced polymerization when the adhesive layer is formed. For example, the thermal polymerization initiator preferably has a 10-hour half-life temperature of 65° C. or more, more preferably 75 to 90° C. The term "half-life," which is an indicator of how fast the polymerization initiator can be decomposed, refers to the time required for the remaining amount of the polymerization initiator to reach one half of the original amount. The decomposition temperature required for a certain half-life time and the half-life time obtained at a certain temperature are shown in catalogs furnished by manufacturers, such as Organic Peroxide Catalog, 9th Edition, May, 2003, furnished by NOF CORPORATION.

Examples of the thermal polymerization initiator include organic peroxides such as lauroyl peroxide (10-hour half-life temperature: 64° C.), benzoyl peroxide (10-hour half-life temperature: 73° C.), 1,1-bis(tert-butylperoxy)-3,3,5-trimethylcyclohexane (10-hour half-life temperature: 90° C.), di(2-ethylhexyl) peroxydicarbonate (10-hour half-life temperature: 49° C.), di(4-tert-butylcyclohexyl) peroxydicarbonate, di-sec-butyl peroxydicarbonate (10-hour half-life temperature: 51° C.), tert-butyl peroxyneodecanoate (10-hour half-life temperature: 48° C.), tert-hexyl peroxypivalate, tert-butyl peroxypivalate, dilauroyl peroxide (10-hour half-life temperature: 64° C.), di-n-octanoyl peroxide, 1,1,3,3-tetramethylbutylperoxy-2-ethyl hexanoate (10-hour half-life temperature: 660° C.), di(4-methylbenzoyl) peroxide, dibenzoyl peroxide (10-hour half-life temperature: 73° C.), tert-butyl peroxyisobutyrate (10-hour half-life temperature: 81° C.), and 1,1-di(tert-hexylperoxy)cyclohexane.

Examples of the thermal polymerization initiator also include azo compounds such as 2,2'-azobisisobutyronitrile (10-hour half-life temperature: 67° C.), 2,2'-azobis(2-methylbutyronitrile) (10-hour half-life temperature: 67° C.), and 1,1-azobis-cyclohexane-1-carbonitrile (10-hour half-life temperature: 87° C.).

The content of the thermal polymerization initiator may be from 0.01 to 20 parts by weight based on 100 parts by weight of the total amount of the curable components (radically polymerizable compounds). The content of the thermal polymerization initiator is preferably from 0.05 to 10 parts by weight, more preferably from 0.1 to 3 parts by weight.

<<Cationically Polymerizable, Curable, Layer-Forming Material>>

The curable component of the cationically polymerizable, curable, layer-forming material may be an epoxy or oxetanyl group-containing compound. The epoxy group-containing compound may be any compound having at least two epoxy groups per molecule. A variety of generally known curable epoxy compounds may be used. Preferred epoxy compounds are, for example, compounds having at least two epoxy groups and at least one aromatic ring per molecule (aromatic-based epoxy compounds) or compounds having at least two epoxy groups per molecule, in which at least one of them is formed between two adjacent carbon atoms that form an alicyclic ring (alicyclic-based epoxy compounds).

<Other Components>

In the invention, the curable, layer-forming material preferably contains the components described below.

<Acryl-Based Oligomer>

In the invention, the active energy ray-curable, layer-forming material may contain, in addition to the radically polymerizable compounds as the curable components, an acryl-based oligomer obtained by polymerization of a (meth)acrylic monomer. The acryl-based oligomer in the active energy ray-curable, layer-forming material can reduce curing-induced shrinkage in the process of curing the transparent resin layer by application of active energy rays and can reduce the stress at the interface between the transparent resin layer and the adherend such as the polarizer. As a result, the acryl-based oligomer can suppress the reduction in the adhesion between the adhesive layer and the adherend. In order to suppress curing-induced shrinkage sufficiently, the content of the acryl-based oligomer is preferably 20 parts by weight or less, more preferably 15 parts by weight or less, based on 100 parts by weight of the total amount of the curable components. If the content of the acryl-based oligomer in the layer-forming material is too high, the reaction rate in the process of applying active energy rays to the layer-forming material may sharply decrease, which may result in insufficient curing. On the other hand, the content of the acryl-based oligomer is preferably 3 parts by weight or more, more preferably 5 parts by weight or more, based on 100 parts by weight of the total amount of the curable components.

In view of workability and uniformity during application, the active energy ray-curable, layer-forming material should preferably have low viscosity. Therefore, the acryl-based oligomer obtained by polymerization of a (meth)acrylic monomer should also preferably have low viscosity. In order to have low viscosity and the ability to prevent the curing-induced shrinkage of the transparent resin layer, the acryl-based oligomer preferably has a weight average molecular weight (Mw) of 15,000 or less, more preferably 10,000 or less, even more preferably 5,000 or less. On the other hand, in order to suppress the curing-induced shrinkage of the transparent resin layer sufficiently, the acryl-based oligomer preferably has a weight average molecular weight (Mw) of 500 or more, more preferably 1,000 or more, even more preferably 1,500 or more. Examples of (meth)acrylic monomers that may be used to form the acryl-based oligomer include (C1 to C20) alkyl (meth)acrylates such as methyl (meth)acrylate, ethyl (meth)acrylate, n-propyl (meth)acrylate, isopropyl (meth)acrylate, 2-methyl-2-nitropropyl (meth)acrylate, n-butyl (meth)acrylate, isobutyl (meth)acrylate, sec-butyl (meth)acrylate, tert-butyl (meth)acrylate, n-pentyl (meth)acrylate, tert-pentyl (meth)acrylate, 3-pentyl (meth)acrylate, 2,2-dimethylbutyl (meth)acrylate, n-hexyl (meth)acrylate, cetyl (meth)acrylate, n-octyl (meth)acrylate, 2-ethylhexyl (meth)acrylate, 4-methyl-2-propylpentyl (meth)acrylate, and n-octadecyl (meth)acrylate; cycloalkyl (meth)acrylates (such as cyclohexyl (meth)acrylate and cyclopentyl (meth)acrylate); aralkyl (meth)acrylates (such as benzyl (meth)acrylate); polycyclic (meth)acrylates (such as 2-isobornyl (meth)acrylate, 2-norbornylmethyl (meth) acrylate, 5-norbornen-2-yl-methyl (meth)acrylate, and 3-methyl-2-norbornylmethyl (meth)acrylate); hydroxyl group-containing (meth)acrylates (such as hydroxyethyl (meth)acrylate, 2-hydroxypropyl (meth)acrylate, and 2,3-dihydroxypropylmethyl-butyl (meth)acrylate); alkoxy group- or phenoxy group-containing (meth)acrylates (such as 2-methoxyethyl (meth)acrylate, 2-ethoxyethyl (meth) acrylate, 2-methoxymethoxyethyl (meth)acrylate, 3-methoxybutyl (meth)acrylate, ethylcarbitol (meth)acrylate, and phenoxyethyl (meth)acrylate); epoxy group-containing (meth)acrylates (such as glycidyl (meth)acrylate); halogen-containing (meth)acrylates (such as 2,2,2-trifluoroethyl (meth)acrylate, 2,2,2-trifluoroethylethyl (meth)acrylate, tetrafluoropropyl (meth)acrylate, hexafluoropropyl (meth)acrylate, octafluoropentyl (meth)acrylate, and heptadecafluorodecyl (meth)acrylate); and alkylaminoalkyl (meth)acrylates (such as dimethylaminoethyl (meth)acrylate). These (meth)acrylates may be used alone or in combination of two or more. Examples of the acryl-based oligomer include ARUFON manufactured by Toagosei Co., Ltd., Actflow manufactured by Soken Chemical & Engineering Co., Ltd., and JONCRYL manufactured by BASF Japan Ltd.

<Photo-Acid Generator>

The active energy ray-curable, layer-forming material may contain a photo-acid generator. When the active energy ray-curable, layer-forming material contains a photo-acid generator, the resulting transparent resin layer can have a dramatically higher level of water resistance and durability than that in the case where the layer-forming material contains no photo-acid generator. The photo-acid generator may be represented by formula (3) below.

Formula (3):

$$L^+X^-$$ [Formula. 3]

wherein $L^+$ represents any onium cation, and $X^-$ represents a counter anion selected from the group consisting of $PF_6^-$, $SbF_6^-$, $AsF_6^-$, $SbCl_6^-$, $BiCl_5^-$, $SnCl_6^-$, $ClO_4^-$, dithiocarbamate anion, and $SCN^-$.

Preferred examples of the onium salt that forms the photo-acid generator include onium salts including any anion selected from $PF_6^-$, $SbF_6^-$, $AsF_6^-$, $SbCl_6^-$, $BiCl_5^-$, $SnCl_6^-$, $ClO_4^-$, dithiocarbamate anion, and $SCN^-$.

More specifically, preferred examples of the photo-acid generator include CYRACURE UVI-6992 and CYRACURE UVI-6974 (all manufactured by The Dow Chemical Company), ADEKA OPTOMER SP150, ADEKA OPTOMER SP152, ADEKA OPTOMER SP170, and ADEKA OPTOMER SP172 (all manufactured by ADEKA CORPORATION), IRGACURE 250 (manufactured by Ciba Specialty Chemicals Inc.), CI-5102 and CI-2855 (all manufactured by Nippon Soda Co., Ltd.), SAN-AID SI-60L, SAN-AID SI-80L, SAN-AID SI-100L, SAN-AID SI-110L, and SAN-AID SI-180L (all manufactured by SANSHIN CHEMICAL INDUSTRY CO., LTD.), CPI-100P and CPI-100A (all manufactured by SAN-APRO LTD.), and WPI-069, WPI-113, WPI-116, WPI-041, WPI-044, WPI-054, WPI-055, WPAG-281, WPAG-567, and WPAG-596 (all manufactured by Wako Pure Chemical Industries, Ltd.).

The content of the photo-acid generator should be 10 parts by weight or less based on 100 parts by weight of the total amount of the curable components, and is preferably from 0.01 to 10 parts by weight, more preferably from 0.05 to 5 parts by weight, even more preferably from 0.1 to 3 parts by weight, based on 100 parts by weight of the total amount of the curable components.

<<Photo-Cationic Polymerization Initiator>>

The cationically polymerizable, curable, layer-forming material should contain, as curable components, the epoxy compound and the oxetane compound described above, which are both curable by cationic polymerization. Therefore, the cationically polymerizable, curable, layer-forming material should contain a photo-cationic polymerization initiator. When irradiated with active energy rays such as visible light, ultraviolet light, X-rays, or electron beams, the photo-cationic polymerization initiator can produce a cationic species or a Lewis acid to initiate the polymerization reaction of the epoxy or oxetanyl group.

A process of forming the transparent resin layer from the curable, layer-forming material may include applying the curable, layer-forming material to the surface of the polarizer and then curing the applied material.

The polarizer may be subjected to a surface modification treatment before the curable, layer-forming material is applied thereto. Specifically, such a treatment may be, for example, a corona treatment, a plasma treatment, or a saponification treatment.

The method for applying the curable, layer-forming material is appropriately selected depending on the viscosity of the curable, layer-forming material or the desired thickness. Examples of application means include a reverse coater, a gravure coater (direct, reverse, or offset), a bar reverse coater, a roll coater, a die coater, a bar coater, and a rod coater. Any other suitable application method such as dipping may also be used.

<Curing of Layer-Forming Material>

The curable, layer-forming material may be used as an active energy ray-curable, layer-forming material or a thermosetting, layer-forming material. The active energy ray-curable, layer-forming material may be of an electron beam-curable type, an ultraviolet-curable type, or a visible light-curable type. In view of productivity, an active energy ray-curable, layer-forming material is more preferred as the curable, layer-forming material than a thermosetting, layer-curable material. Also in view of productivity, a visible light-curable, layer-forming material is more preferred as the active energy ray-curable, layer-forming material.

<<Active Energy Ray-Curable Type>>

When the active energy ray-curable, layer-forming material is used, the active energy ray-curable, layer-forming material may be applied to the polarizer and then irradiated with active energy rays (such as electron beams, ultraviolet rays, or visible rays) so that the active energy ray-curable, layer-forming material can be cured to form the transparent resin layer. Active energy rays (such as electron beams, ultraviolet rays, or visible rays) may be applied in any suitable direction. Preferably, active energy rays are applied from the transparent resin layer side.

<<Electron Beam-Curable Type>>

When the active energy ray-curable, layer-forming material is of an electron beam-curable type, electron beams may be applied under any appropriate conditions where the active energy ray-curable, layer-forming material can be cured. For example, electron beams are preferably applied at an acceleration voltage of 5 kV to 300 kV, more preferably 10 kV to 250 kV. If the acceleration voltage is lower than 5 kV, electron beams may fail to reach the deepest portion of the transparent resin layer, so that insufficient curing may occur. If the acceleration voltage is higher than 300 kV, electron beams can have too high intensity penetrating through the material and thus may damage the protective film or the polarizer. The exposure dose is preferably from 5 to 100 kGy, more preferably from 10 to 75 kGy. At an exposure dose of less than 5 kGy, the adhesive may be insufficiently cured. An exposure dose of more than 100 kGy may damage the protective film or the polarizer and cause yellow discoloration or a reduction in mechanical strength, which may make it impossible to obtain the desired optical properties.

Electron beam irradiation is generally performed in an inert gas. If necessary, however, electron beam irradiation may be performed in the air or under conditions where a small amount of oxygen is introduced.

<<Ultraviolet-Curable Type and Visible Light-Curable Type>>

In a method for producing the polarizing film according to the invention, the active energy rays used preferably include visible rays in the wavelength range of 380 nm to 450 nm, specifically, visible rays whose dose is the highest in the wavelength range of 380 nm to 450 nm. In the invention, the active energy ray source is preferably a gallium-containing metal halide lamp or an LED light source capable of emitting light in the wavelength range of 380 to 440 nm. Alternatively, a low-pressure mercury lamp, a middle-pressure mercury lamp, a high-pressure mercury lamp, an ultra-high-pressure mercury lamp, an incandescent lamp, a xenon lamp, a halogen lamp, a carbon arc lamp, a metal halide lamp, a fluorescent lamp, a tungsten lamp, a gallium lamp, an excimer laser, or a source of light including ultraviolet and visible rays, such as sunlight, may be used, and light sources may be used in combination with a band pass filter to block ultraviolet rays with wavelengths shorter than 380 nm.

<<Thermosetting Type>>

On the other hand, when the thermosetting, layer-forming material is used, it may be heated after the polarizer and the protective film are bonded together so that the thermal polymerization initiator can initiate the polymerization to form a cured product layer. The heating temperature may be from about 60 to about 200° C., preferably from 80 to 150° C., though it is selected depending on the thermal polymerization initiator.

For example, a cyanoacrylate-based, layer-forming material, an epoxy-based, layer-forming material, or an isocyanate-based, layer-forming material may also be used as a material for forming the transparent resin layer.

Examples of the cyanoacrylate-based, layer-forming material include alkyl-α-cyanoacrylates such as methyl-α-cyanoacrylate, ethyl-α-cyanoacrylate, butyl-α-cyanoacrylate, and octyl-α-cyanoacrylate, and cyclohexyl-α-cyanoacrylate and methoxy-α-cyanoacrylate. The cyanoacrylate-based, layer-forming material may be, for example, one used as a cyanoacrylate-based adhesive.

An epoxy resin may be used alone for the epoxy-based, layer-forming material, or an epoxy curing agent may be added to an epoxy resin for the epoxy-based, layer-forming material. When an epoxy resin is used alone, a photopolymerization initiator should be added to the epoxy-based, layer-forming material so that the material can be cured by application of active energy rays. When an epoxy curing agent is added to the epoxy-based, layer-forming material, the epoxy curing agent may be, for example, one used for epoxy-based adhesives. The epoxy-based, layer-forming material should be used in the form of a two-component system, in which a curing agent is added to an epoxy resin, though it may also be used in the form of a one-component system, which contains an epoxy resin and a curing agent therefor. The epoxy-based, layer-forming material is generally used in the form of a solution. The solution may be a solvent-based solution, an emulsion, a colloidal dispersion, or a water-based solution such as an aqueous solution.

Examples of the epoxy resin may include a variety of compounds having two or more epoxy groups per molecule, such as bisphenol type epoxy resins, aliphatic-based epoxy resins, aromatic-based epoxy resins, halogenated bisphenol type epoxy resins, and biphenyl-based epoxy resins. The epoxy resin may be appropriately selected depending on the epoxy equivalent or the number of functional groups. In view of durability, epoxy resins with an epoxy equivalent of 500 or less are preferably used.

The curing agent for the epoxy resin may be any of various types, such as a phenolic-based resin curing agent, an acid anhydride-based curing agent, a carboxylic acid-based curing agent, and a polyamine-based curing agent. Examples of the phenolic-based resin curing agent that may be used include phenol novolac resins, bisphenol novolac resins, xylylene phenol resins, and cresol novolac resins. Examples of the acid anhydride-based curing agent include maleic anhydride, tetrahydrophthalic anhydride, hexahydrophthalic anhydride, and succinic anhydride. Examples of the carboxylic acid-based curing agent include carboxylic acids such as pyromellitic acid and trimellitic acid; and blocked carboxylic acids formed by addition of vinyl ether to carboxylic acids. The two component-type, epoxy-based, layer-forming material may be, for example, a combination of two components including an epoxy resin and a polythiol, or a combination of two components including an epoxy resin and a polyamide.

The content of the curing agent is preferably from 30 to 70 parts by weight, more preferably from 40 to 60 parts by weight, based on 100 parts by weight of the epoxy resin, though it may vary with the epoxy resin equivalent.

The epoxy-based, layer-forming material may also contain any of various curing accelerators in addition to the epoxy resin and the curing agent therefor. Examples of curing accelerators include various imidazole-based compounds and derivatives thereof, and dicyandiamide.

The isocyanate-based, layer-forming material may be a crosslinking agent used in the formation of pressure-sensitive adhesive layers. A compound having at least two isocyanate groups may be used as such an isocyanate-based crosslinking agent. For example, the polyisocyanate compound may be used as the isocyanate-based, layer-forming material. Specific examples thereof include 2,4-tolylene diisocyanate, 2,6-tolylene diisocyanate, xylylene diisocyanate, 1,3-bisisocyanatomethylcyclohexane, hexamethylene diisocyanate, tetramethylxylylene diisocyanate, m-isopropenyl-α,α-dimethylbenzyl isocyanate, methylene bis(4-phenyl isocyanate), p-phenylene diisocyanate, or dimers thereof, trimers such as tris(6-isocyanatohexyl) isocyanurate, and reaction products thereof with a polyhydric alcohol or a polyamine, such as biuret or trimethylolpropane. The isocyanate-based crosslinking agent is also preferably a compound having three or more isocyanate groups, such as tris(6-isocyanatehexyl) isocyanurate. Examples of the isocyanate-based, layer-forming material include those used as isocyanate-based adhesives.

In particular, an isocyanate-based, layer-forming material having a rigid structure in which a cyclic structure (such as a benzene ring, a cyanurate ring, or an isocyanurate ring) makes up a large part of the molecular structure is preferably used. For example, trimethylolpropane-tri-tolyleneisocyanate or tris (hexamethyleneisocyanate) isocyanurate is preferably used for the isocyanate-based, layer-forming material.

The isocyanate-based crosslinking agent to be used may have a protecting group attached to the terminal isocyanate group. The protecting group may be, for example, an oxime or a lactam. The protecting group attached to the isocyanate group can be dissociated from the isocyanate group by heating, so that the isocyanate group becomes available for reaction.

A reaction catalyst may be further used to enhance the reactivity of the isocyanate group. Such a reaction catalyst is preferably, but not limited to, a tin-based catalyst or an amine catalyst. One or two or more reaction catalysts may be used. The reaction catalyst is generally used in an amount of 5 parts by weight or less based on 100 parts by weight of the isocyanate crosslinking agent. If the amount of the reaction catalyst is large, the crosslinking reaction rate may be high so that the layer-forming material may foam. If the foamed, layer-forming material is used, sufficient adhesion cannot be obtained. In general, the reaction catalyst is preferably used in an amount of 0.01 to 5 parts by weight, more preferably 0.05 to 4 parts by weight.

The tin-based catalyst may be any of an inorganic tin-based catalyst and an organo-tin-based catalyst. Preferably, the tin-based catalyst is an organo-tin-based catalyst. The inorganic tin-based catalyst may be, for example, stannous chloride or stannic chloride. The organo-tin-based catalyst preferably has at least one organic group such as an aliphatic or alicyclic group having a methyl, ethyl, ether, ester, or any other group in the skeleton. Specific examples thereof include tetra-n-butyltin, tri-n-butyltin acetate, n-butyltin trichloride, trimethyltin hydroxide, dimethyltin dichloride, and dibutyltin dilaurate.

The amine-based catalyst may also be of any type. For example, the amine catalyst preferably has an organic group such as quinocridine, amidine, diazabicycloundecene, or any other alicyclic group. In addition, the amine-based catalyst may also be triethylamine. Besides the above, examples of the reaction catalyst also include cobalt naphthenate and benzyltrimethylammonium hydroxide.

The isocyanate-based, layer-forming material is generally used in the form of a solution. The solution may be a solvent-based solution, a water-based solution such as an emulsion, a colloidal dispersion and an aqueous solution. Any organic solvent capable of uniformly dissolving the components of the layer-forming material may be used. Examples of such an organic solvent include toluene, methyl ethyl ketone, and ethyl acetate. When a water-based solution is formed, for example, an alcohol such as n-butyl alcohol or isopropyl alcohol or a ketone such as acetone may also be added to the water-based solution. When a water-based solution is formed, a dispersing agent may be used, or a functional group less reactive with the isocyanate group, such as a carboxylate salt, a sulfonate salt, or a quaternary ammonium salt, or a water-dispersible component such as polyethylene glycol may be introduced into the isocyanate-based crosslinking agent.

The conditions for forming the transparent resin layer from the cyanoacrylate-based, epoxy-based, or isocyanate-based, layer-forming material may be appropriately selected depending on the type of the layer-forming material. In general, the transparent layer can be formed by drying the layer-forming material at about 30 to about 100° C., preferably at 50 to 80° C., for about 0.5 to about 15 minutes. When the cyanoacrylate-based, layer-forming material is used, the transparent resin layer can be formed in a time shorter than the above time because the material can be cured faster.

The transparent resin layer may also be formed from a layer-forming material containing no curable component. For example, the transparent layer may also be formed from a layer-forming material including the polyvinyl alcohol-based resin as a main component. The polyvinyl alcohol-based resin used to form the transparent resin layer may be the same as or different from the polyvinyl alcohol-based resin in the polarizer as long as it falls under the category of "polyvinyl alcohol-based resin."

The polyvinyl alcohol-based resin may be, for example, polyvinyl alcohol. Polyvinyl alcohol can be obtained by saponifying polyvinyl acetate. The polyvinyl alcohol-based resin may also be a product produced by saponifying a copolymer of vinyl acetate and any other monomer or monomers copolymerizable therewith. In this case, when the copolymerizable monomer is ethylene, an ethylene-vinyl alcohol copolymer can be obtained. Examples of the copolymerizable monomer include unsaturated carboxylic acids such as maleic acid (anhydride), fumaric acid, crotonic acid, itaconic acid, and (meth)acrylic acid, and esters thereof; α-olefins such as ethylene and propylene; (sodium) (meth) allylsulfonate, sodium sulfonate (monoalkyl maleate), sodium disulfonate alkyl maleate, N-methylolacrylamide, acrylamide alkyl sulfonate alkali salts, N-vinylpyrrolidone, and N-vinylpyrrolidone derivatives. These polyvinyl alcohol-based resins may be used alone or in combination of two or more. The heat of crystal fusion of the transparent resin layer should be controlled to 30 mj/mg or more so that the transparent resin layer can have a satisfactory level of moist heat resistance or water resistance. From this point of view, the polyvinyl alcohol-based resin is preferably polyvinyl alcohol obtained by saponifying polyvinyl acetate.

The polyvinyl alcohol-based resin to be used may have a saponification degree of, for example, 95% or more. In order to control the heat of crystal fusion of the transparent resin layer to 30 mj/mg or more so that it can have a satisfactory level of moist heat resistance or water resistance, the polyvinyl alcohol-based resin preferably has a saponification degree of 99.0% or more, more preferably 99.7% or more. The saponification degree indicates the proportion of the units actually saponified to vinyl alcohol units in the units capable of being converted to vinyl alcohol units by saponification, after which vinyl ester units can remain as residues. The saponification degree can be determined according to JIS K 6726-1994.

The polyvinyl alcohol-based resin to be used may have an average degree of polymerization of, for example, 500 or more. In order to control the heat of crystal fusion of the transparent resin layer to 30 mj/mg or more so that it can have a satisfactory level of moist heat resistance or water resistance, the polyvinyl alcohol-based resin preferably has an average degree of polymerization of 1,000 or more, more preferably 1,500 or more, even more preferably 2,000 or more. The average degree of polymerization of the polyvinyl alcohol-based resin can be measured according to JIS K 6726.

The polyvinyl alcohol-based resin to be used may also be a modified polyvinyl alcohol-based resin having a hydrophilic functional group on the side chain of the polyvinyl alcohol or copolymerized polyvinyl alcohol. The hydrophilic functional group may be, for example, an acetoacetyl group or a carbonyl group. Other examples of the polyvinyl alcohol resin that may be used include modified polyvinyl alcohols obtained by, for example, acetalization, urethanation, etherification, or phosphorylation of polyvinyl alcohol resin or grafting on polyvinyl alcohol resin.

The layer-forming material containing the polyvinyl alcohol-based resin as a main component may contain a curable component (crosslinking agent). The content of the polyvinyl alcohol-based resin in the transparent resin layer or the layer-forming material (solid basis) is preferably 80% by weight or more, more preferably 90% by weight or more, even more preferably 95% by weight or more. In order to make it easy to control the heat of crystal fusion of the transparent resin layer to 30 mj/mg or more, the layer-forming material is preferably free of any curable component (crosslinking agent).

A compound having at least two functional groups reactive with the polyvinyl alcohol-based resin may be used as the crosslinking agent. Examples of such a compound include alkylenediamines having an alkylene group and two amino groups, such as ethylenediamine, triethylenediamine, and hexamethylenediamine; isocyanates such as tolylene diisocyanate, hydrogenated tolylene diisocyanate, trimethylolpropane tolylene diisocyanate adducts, triphenylmethane triisocyanate, methylene bis(4-phenylmethanetriisocyanate, isophorone diisocyanate, and ketoxime blocked compounds thereof or phenol blocked compounds thereof; epoxies such as ethylene glycol diglycidyl ether, polyethylene glycol diglycidyl ether, glycerin di- or triglycidyl ether, 1,6-hexanediol diglycidyl ether, trimethylolpropane triglycidyl ether, diglycidyl aniline, and diglycidyl amine; monoaldehydes such as formaldehyde, acetaldehyde, propionaldehyde, and butylaldehyde; dialdehydes such as glyoxal, malondialdehyde, succindialdehyde, glutardialdehyde, maleic dialdehyde, and phthaldialdehyde; amino-formaldehyde resins such as condensates of formaldehyde with methylolurea, methylolmelamine, alkylated methylolurea, alkylated methylolmelamine, acetoguanamine, or benzoguanamine; dicarboxylic acid dihydrazides such as adipic acid dihydrazide, oxalic acid dihydrazide, malonic acid dihydrazide, succinic acid dihydrazide, glutaric acid dihydrazide, isophthalic acid dihydrazide, sebacic acid dihydrazide, maleic acid dihydrazide, fumaric acid dihydrazide, and itaconic acid dihydrazide; and water-soluble dihydrazines such as ethylene-1,2-dihydrazine, propylene-1,3-dihydrazine, and butylene-1, 4-dihydrazine. Among them, amino-formaldehyde resins and water-soluble dihydrazines are preferred. The amino-formaldehyde resins are preferably methylol group-containing compounds. Methylolmelamine is particularly preferred among the methylol group-containing compounds.

The curable component (crosslinking agent) may be used to improve water resistance, in which the content of the curable component (crosslinking agent) is preferably 20 parts by weight or less, 10 parts by weight or less, or 5 parts by weight or less, based on 100 parts by weight of the polyvinyl alcohol-based resin.

The layer-forming material may be prepared as a solution by dissolving the polyvinyl alcohol-based resin in a solvent. Examples of the solvent include water, dimethyl sulfoxide, dimethylformamide, dimethylacetamide, N-methylpyrrolidone, various glycols, alcohols including polyhydric alcohols, and amines such as ethylenediamine and diethylenetriamine. These solvents may be used alone or in combination of two or more. Among them, water is preferably used as the solvent to form the layer-forming material as an aqueous solution. The concentration of the polyvinyl alcohol-based resin in the layer-forming material (e.g., an aqueous solution) may be, but not limited to, 0.1 to 15% by weight, preferably 0.5 to 10% by weight, in view of coatability, shelf stability, and other properties.

The layer-forming material (e.g., an aqueous solution) may contain an additive such as a plasticizer or a surfactant. The plasticizer may be, for example, a polyhydric alcohol such as ethylene glycol or glycerin. The surfactant may be, for example, a nonionic surfactant. The layer-forming material may also contain a coupling agent such as a silane coupling agent or a titanium coupling agent, any of various tackifiers, an ultraviolet absorber, an antioxidant, and a stabilizer such as a heat-resistant stabilizer or a hydrolysis-resistant stabilizer.

The transparent resin layer may be formed by applying the layer-forming material to the other surface of the polarizer (the surface opposite to its surface on which the protective film is placed) and drying the material. The application process is not limited, and any appropriate method may be used in the application process. For example, roll coating, spin coating, wire bar coating, dip coating, die coating, curtain coating, spray coating, knife coating, (such as comma coating), or various other methods may be used.

The transparent resin layer is preferably made from an ultraviolet-curable acryl-based resin, an ultraviolet-curable epoxy-based resin, a urethane-based resin, or a polyvinyl alcohol-based resin. The urethane-based resin layer can be made from the isocyanate-based, layer-forming material.

<Pressure-Sensitive Adhesive Layer>

The pressure-sensitive adhesive layer may be formed using any appropriate type of pressure-sensitive adhesive. Examples of the pressure-sensitive adhesive include a rubber-based pressure-sensitive adhesive, an acryl-based pressure-sensitive adhesive, a silicone-based pressure-sensitive adhesive, a urethane-based pressure-sensitive adhesive, a vinyl alkyl ether-based pressure-sensitive adhesive, a polyvinyl alcohol-based pressure-sensitive adhesive, a polyvinylpyrrolidone-based pressure-sensitive adhesive, a polyacrylamide-based pressure-sensitive adhesive, and a cellulose-based pressure-sensitive adhesive.

Among these pressure-sensitive adhesives, those having a high level of optical transparency and weather resistance or heat resistance and exhibiting an appropriate level of wettability and adhesive properties such as cohesiveness and adhesiveness are preferably used. An acryl-based pressure-sensitive adhesive is preferably used because it has such properties.

The pressure-sensitive adhesive layer can be formed by a method including applying the pressure-sensitive adhesive to a release-treated separator or other means, removing the polymerization solvent and other components from the adhesive by drying to form a pressure-sensitive adhesive layer, and then transferring the pressure-sensitive adhesive layer onto the polarizer in the embodiment of FIG. 2A (or onto the protective film in the embodiment of FIG. 2B). Alternatively, the pressure-sensitive adhesive layer can be formed by a method including applying the pressure-sensitive adhesive to the polarizer in the embodiment of FIG. 2A (or to the protective film in the embodiment of FIG. 2B) and removing the polymerization solvent and other components from the adhesive by drying to form a pressure-sensitive adhesive layer on the polarizer. In the process of applying the pressure-sensitive adhesive, if necessary, one or more solvents other than the polymerization solvent may be newly added to the adhesive.

A silicone release liner is preferably used as the release-treated separator. In the invention, the pressure-sensitive adhesive may be applied to such a liner and then dried to form a pressure-sensitive adhesive layer. In this process, any appropriate method may be used for drying the pressure-sensitive adhesive, depending on purpose. Preferably, a method of heating and drying the coating film is used. The heating and drying temperature is preferably from 40° C. to 200° C., more preferably from 50° C. to 180° C., even more preferably from 70° C. to 170° C. When the heating temperature is set in the range, a pressure-sensitive adhesive with a high level of adhesive properties can be obtained.

Any appropriate drying time may be used as needed. The drying time is preferably from 5 seconds to 20 minutes, more preferably from 5 seconds to 10 minutes, even more preferably from 10 seconds to 5 minutes.

Various methods may be used to form the pressure-sensitive adhesive layer. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or other means.

To resist peeling, the pressure-sensitive adhesive layer preferably has a thickness of 1 μm or more, more preferably 5 μm or more. On the other hand, if the pressure-sensitive adhesive layer is too thick, mechanical shock applied after the bonding of the polarizing film to a liquid crystal cell can cause the polarizer to bend significantly so that nano-slits can easily occur. Therefore, the pressure-sensitive adhesive layer preferably has a thickness of 40 μm or less, more preferably 35 μm or less, even more preferably 25 μm or less. Also in order to suppress thermal shock-induced shrinkage of the polarizer, the pressure-sensitive adhesive layer preferably has a thickness of 35 μm or less.

The pressure-sensitive adhesive layer preferably has a storage modulus of $1.0 \times 10^4$ Pa or more at 23° C. so that reliable crack resistance (suppression of the occurrence of nano-slits) can be achieved by preventing loading which would otherwise be caused by convex bending of the pressure-sensitive-adhesive-layer-attached polarizing film toward the polarizer side. The storage modulus of the pressure-sensitive adhesive layer is preferably $5.0 \times 10^4$ Pa or more. On the other hand, the pressure-sensitive adhesive with too high a storage modulus can be too hard so that it will tend to degrade reworkability. Therefore, the storage modulus of the pressure-sensitive adhesive layer is preferably $1 \times 10^8$ Pa or less, more preferably $1 \times 10^7$ Pa or less.

When the pressure-sensitive adhesive layer is exposed, the pressure-sensitive adhesive layer may be protected by a release-treated sheet (separator) until it is actually used.

Examples of the material used to form such a separator include a plastic film such as a polyethylene, polypropylene, polyethylene terephthalate, or polyester film, a paper, a cloth, a porous material such as nonwoven fabric, and appropriate thin materials such as a net, a foamed sheet, a metal foil, and any laminate thereof. A plastic film is preferably used because of its good surface smoothness.

Such a plastic film may be of any type capable of protecting the pressure-sensitive adhesive layer. Such a plastic film may be, for example, a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, or an ethylene-vinyl acetate copolymer film.

The separator generally has a thickness of about 5 to about 200 μm, preferably about 5 to about 100 μm. If necessary, the separator may be subjected to a release treatment and an anti-pollution treatment with a silicone-based, fluoride-based, long-chain alkyl-based, or fatty acid amide-based release agent, a silica powder, or other materials, or subjected to an antistatic treatment of coating type, kneading and mixing type, vapor-deposition type, or other types. In particular, when the surface of the separator is appropriately subjected to a release treatment such as a silicone treatment, a long-chain alkyl treatment, or a fluorine treatment, the releasability from the pressure-sensitive adhesive layer can be further improved.

<Surface Protective Film>

A surface protective film may be provided on the one-side-protected polarizing film or the pressure-sensitive-adhesive-layer-attached polarizing film. The surface protective film generally has a base film and a pressure-sensitive adhesive layer. The surface protective film protects the polarizer with the pressure-sensitive adhesive layer interposed between them.

In view of the ability to be tested or managed, an isotropic or nearly-isotropic film material should be selected as the base film for the surface protective film. Examples of such a film material include polyester-based resins such as polyethylene terephthalate films, cellulose-based resins, acetate-based resins, polyethersulfone-based resins, polycarbonate-based resins, polyamide-based resins, polyimide-based resins, polyolefin-based resins, acryl-based resins, and other transparent polymers. In particular, polyester-based resins are preferred. The base film may be made of a single film material or a laminate of two or more film materials. The base film may also be a product obtained by stretching the film. The base film generally has a thickness of 500 μm or less, preferably 10 to 200 μm.

The pressure-sensitive adhesive used to form the pressure-sensitive adhesive layer for the surface protective film may be appropriately selected from pressure-sensitive adhesives including, as a base polymer, a (meth)acryl-based polymer, a silicone-based polymer, polyester, polyurethane, polyamide, polyether, fluoride-based polymer, rubber-based polymer, or any other polymer. An acrylic pressure-sensitive adhesive containing an acryl-based polymer as a base polymer is preferred in view of transparency, weather resistance, heat resistance, and other properties. The thickness (dry thickness) of the pressure-sensitive adhesive layer is selected depending on the desired adhesive strength. The thickness of the pressure-sensitive adhesive is generally from about 1 to about 100 µm, preferably from 5 to 50 µm.

A silicone, long-chain alkyl, or fluorine treatment with a low-adhesion material may also be performed to form a release treatment layer on the surface of the base film of the surface protective film, opposite to its surface on which the pressure-sensitive adhesive layer is provided.

<Other Optical Layers>

For practical use, the one-side-protected polarizing film of the invention or the pressure-sensitive-adhesive-layer-attached polarizing film of the invention may be laminated with any other optical layer or layers to form an optical film. As a non-limiting example, such an optical layer or layers may be one or more optical layers that have ever been used to form liquid crystal display devices or other devices, such as a reflector, a transflector, a retardation plate (including a wavelength plate such as a half or quarter wavelength plate), or a viewing angle compensation film. Particularly preferred is a reflective or transflective polarizing film including a laminate of the one-side-protected polarizing film of the invention and a reflector or a transflector, an elliptically or circularly polarizing film including a laminate of the polarizing film of the invention and a retardation plate, a wide viewing angle polarizing film including a laminate of the polarizing film of the invention and a viewing angle compensation film, or a polarizing film including a laminate of the polarizing film of the invention and a brightness enhancement film.

The optical film including a laminate of the above optical layer and the one-side-protected polarizing film or the pressure-sensitive-adhesive-layer-attached polarizing film may be formed by a method of stacking them one by one, for example, in the process of manufacturing a liquid crystal display device. However, the optical film should be formed by stacking them in advance, which is superior in quality stability or assembling workability and thus advantageous in facilitating the process of manufacturing liquid crystal display devices or other devices. In the lamination, any appropriate bonding means such as a pressure-sensitive adhesive layer may be used. When the pressure-sensitive-adhesive-layer-attached polarizing film and any other optical film are bonded together, their optical axes may be each aligned at an appropriate angle, depending on the desired retardation properties or other desired properties.

The one-side-protected polarizing film, the pressure-sensitive-adhesive-layer-attached polarizing film, or the optical film according to the invention is preferably used to form various image display devices such as liquid crystal display devices and organic EL display devices. Liquid crystal display devices may be formed according to conventional techniques. Specifically, a liquid crystal display device may be typically formed according to any conventional techniques by appropriately assembling a liquid crystal cell, pressure-sensitive-adhesive-layer-attached polarizing films or optical films, and optional components such as a lighting system, incorporating a driving circuit, and performing other processes, except that the one-side-protected polarizing film, the pressure-sensitive-adhesive-layer-attached polarizing film, or the optical film according to the invention is used. The liquid crystal cell to be used may also be of any type, such as IPS type or VA type. The invention is particularly suitable for IPS type.

Any desired liquid crystal display device may be formed, such as a liquid crystal display device including a liquid crystal cell and the one-side-protected polarizing film or films, the pressure-sensitive-adhesive-layer-attached polarizing film or films, or the optical film or films placed on one or both sides of the liquid crystal cell, or a liquid crystal display device further including a backlight or a reflector in the lighting system. In such a case, the pressure-sensitive-adhesive-layer-attached polarizing film or films or the optical film or films according to the invention may be placed on one or both sides of the liquid crystal cell. When the one-side-protected polarizing films, the pressure-sensitive-adhesive-layer-attached polarizing films, or the optical films are provided on both sides, they may be the same or different. The process of forming the liquid crystal display device may also include placing, at an appropriate position or positions, one or more layers of an appropriate component such as a diffusion plate, an antiglare layer, an anti-reflection film, a protective plate, a prism array, a lens array sheet, a light diffusion plate, or a backlight.

<Method for Continuously Producing Image Display Device>

The image display device described above is preferably produced by a continuous production method (roll-to-panel process) including the steps of: unwinding the pressure-sensitive-adhesive-layer-attached polarizing film of the invention from a roll thereof; feeding the pressure-sensitive-adhesive-layer-attached polarizing film with the separator; and continuously bonding the pressure-sensitive-adhesive-layer-attached polarizing film to the surface of an image display panel with the pressure-sensitive adhesive layer interposed therebetween. The pressure-sensitive-adhesive-layer-attached polarizing film of the invention is a very thin film. Therefore, if the pressure-sensitive-adhesive-layer-attached polarizing film of the invention is subjected to a process that includes cutting the film into sheet pieces (cut pieces) and then bonding the pieces one by one to image display panels (also referred to as a "sheet-to-panel process"), the sheets will be difficult to feed or handle during the bonding of them to the display panels, so that the risk for the pressure-sensitive-adhesive-layer-attached polarizing films (sheets) to undergo high mechanical shock (such as suction-induced bending) will increase during these processes. In order to reduce the risk, other measures should be taken, such as using a relatively thick surface protective film including a base film with a thickness of 50 µm or more. In contrast, the roll-to-panel process allows the pressure-sensitive-adhesive-layer-attached polarizing film to be stably fed from the roll to the image display panel with the aid of the separator, without cutting the film into sheet pieces (cut pieces), and also allows the film to be directly bonded to the image display panel, which makes it possible to significantly reduce the risk without using a relatively thick surface protective film. This, together with the ability of the transparent resin layer to relieve mechanical shock, allows high-speed continuous production of image display panels in which the occurrence of nano-slits is effectively suppressed.

Figure 8:
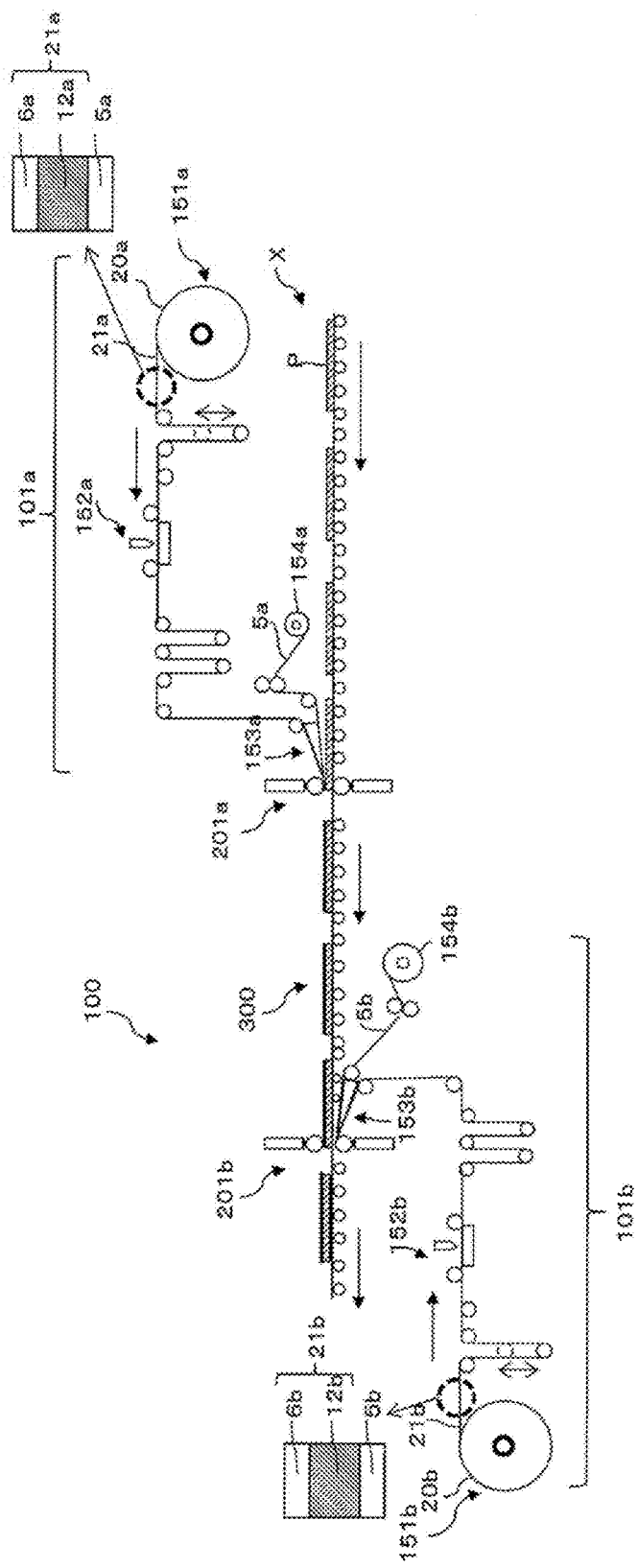
FIG. 8 is a schematic cross-sectional view of an example of a system for continuously producing image display devices.

FIG. 8 is a schematic diagram illustrating an example of a system for continuously producing liquid crystal devices using the roll-to-panel process.

As illustrated in FIG. 8, a system 100 for continuously producing liquid crystal display devices includes a continuous feed unit X configured to feed liquid crystal display panels P, a first polarizing film supply unit 101a, a first bonding unit 201a, a second polarizing film supply unit 101b, and a second bonding unit 201b.

In this case, a roll 20a of a first pressure-sensitive-adhesive-layer-attached polarizing film (a first roll) and a roll 20b of a second pressure-sensitive-adhesive-layer-attached polarizing film (a second roll) are used, in which the films each have an absorption axis in the longitudinal direction and each have the structure shown in FIG. 2A.

(Feed Unit)

The feed unit X is configured to feed liquid crystal display panels P. The feed unit X includes a plurality of feed rollers, suction plates, and other components. The feed unit X includes an orientation changing unit 300 that is provided between the first and second bonding units 201a and 201b and configured to interchange the positional relationship between the long and short sides of the liquid crystal panel P with respect to the direction of the feed of the liquid crystal display panel P (e.g., by horizontally turning the liquid crystal display panel P by 90°). This allows the first and second pressure-sensitive-adhesive-layer-attached polarizing films 21a and 21b to be bonded in a cross-Nicols relationship to the liquid crystal display panel P.

(First Polarizing Film Supply Unit)

The first polarizing film supply unit 101a is configured to unwind the first pressure-sensitive-adhesive-layer-attached polarizing film 21a (with a surface protective film) from the first roll 20a, feed the film 21a with the separator 5a, and continuously supply the film 21a to the first bonding unit 201a. The first polarizing film supply unit 101a includes a first unwinding unit 151a, a first cutting unit 152a, a first peeling unit 153a, a first winding unit 154a, a plurality of feed roller units, an accumulator unit including dancer rolls, and other components.

The first unwinding unit 151a has an unwinding shaft on which the first roll 20a is placed, and is configured to unwind, from the first roll 20a, the long, pressure-sensitive-adhesive-layer-attached, polarizing film 21a provided with the separator 5a.

The first cutting unit 152a includes cutting means such as a cutter or a laser and suction means. The first cutting unit 152a is configured to form a piece with a predetermined length by transversely cutting the first long pressure-sensitive-adhesive-layer-attached polarizing film 21a and leaving the separator 5a uncut. Alternatively, the first roll 20a may be a roll of a laminate of the separator 5a and the long pressure-sensitive-adhesive-layer-attached polarizing film with a plurality of score lines formed in the widthwise direction at predetermined intervals (a scored optical film roll). In this case, the first cutting unit 152a is unnecessary (this also applies to the second cutting unit 152b described below).

The first peeling unit 153a is configured to peel off the first pressure-sensitive-adhesive-layer-attached polarizing film 21a from the separator 5a by inwardly folding back the separator 5a. The first peeling unit 153a may include a wedge-shaped member, rollers, and other components.

The first winding unit 154a is configured to wind the separator 5a from which the first pressure-sensitive-adhesive-layer-attached polarizing film 21a has been peeled off. The first winding unit 154a has a winding shaft on which a roll for winding the separator 5a is placed.

(First Bonding Unit)

The first bonding unit 201a is configured to continuously bond the first pressure-sensitive-adhesive-layer-attached polarizing film 21a, which has been peeled off by the first peeling unit 153a, to the liquid crystal display panel P, which is being fed by the feed unit X, with the pressure-sensitive adhesive layer of the first pressure-sensitive-adhesive-layer-attached polarizing film 21a interposed therebetween (first bonding step). The first bonding unit 81 includes a pair of bonding rollers, at least one of which includes a drive roller.

(Second Polarizing Film Supply Unit)

The second polarizing film supply unit 101b is configured to unwind the second pressure-sensitive-adhesive-layer-attached polarizing film 21b (with a surface protective film) from the second roll 20b, feed the film 21b with the separator 5b, and continuously supply the film 21b to the second bonding unit 201b. The second polarizing film supply unit 101b includes a second unwinding unit 151b, a second cutting unit 152b, a second peeling unit 153b, a second winding unit 154b, a plurality of feed roller units, an accumulator unit including dancer rolls, and other components. The second unwinding unit 151b, the second cutting unit 152b, the second peeling unit 153b, and the second winding unit 154b have the same structures and functions as those of the first unwinding unit 151a, the first cutting unit 152a, the first peeling unit 153a, and the first winding unit 154a, respectively.

(Second Bonding Unit)

The second bonding unit 201b is configured to continuously bond the second pressure-sensitive-adhesive-layer-attached polarizing film 21b, which has been peeled off by the second peeling unit 153b, to the liquid crystal display panel P, which is being fed by the feed unit X, with the pressure-sensitive adhesive layer of the second pressure-sensitive-adhesive-layer-attached polarizing film 21b interposed therebetween (second bonding step). The second bonding unit 201b includes a pair of bonding rollers, at least one of which includes a drive roller.

EXAMPLES

Hereinafter, the invention will be more specifically described with reference to examples. It will be understood that the examples shown below are not intended to limit the invention. In each example, "parts" and "%" are all by weight. Unless otherwise specified below, the conditions of standing at room temperature include 23° C. and 65% RH in all cases.

<Preparation of Polarizer>

(Preparation of Polarizer A0)

A corona treatment was performed on one surface of an amorphous isophthalic acid-copolymerized polyethylene terephthalate (IPA-copolymerized PET) film substrate (100 µm in thickness) with a water absorption of 0.75% and a Tg of 75° C. An aqueous solution containing polyvinyl alcohol (4,200 in polymerization degree, 99.2% by mole in saponification degree) and acetoacetyl-modified PVA (Gohsefimer Z200 (trade name) manufactured by The Nippon Synthetic Chemical Industry Co., Ltd., 1,200 in polymerization degree, 4.6% in acetoacetyl modification degree, 99.0% by mole or more in saponification degree) in a ratio of 9:1 was applied to the corona-treated surface at 25° C. and then dried to form a 11-μm-thick PVA-based resin layer, so that a laminate was formed.

In an oven at 120° C., the resulting laminate was subjected to free-end uniaxial stretching to 2.0 times in the longitudinal direction between rolls at different peripheral speeds (auxiliary in-air stretching).

Subsequently, the laminate was immersed in an insolubilization bath (an aqueous boric acid solution obtained by adding 4 parts by weight of boric acid to 100 parts by weight of water) at a temperature of 30° C. for 30 seconds (insolubilization).

Subsequently, the laminate was immersed in a dyeing bath at a temperature of 30° C. while the iodine concentration and the immersion time were so controlled as to allow the resulting polarizing plate to have a predetermined transmittance. In this example, the laminate was immersed for 60 seconds in an aqueous iodine solution obtained by adding 0.2 parts by weight of iodine and 1.0 part by weight of potassium iodide to 100 parts by weight of water (dyeing).

Subsequently, the laminate was immersed for 30 seconds in a crosslinking bath (an aqueous boric acid solution obtained by adding 3 parts by weight of potassium iodide and 3 parts by weight of boric acid to 100 parts by weight of water) at a temperature of 30° C. (crosslinking).

The laminate was then uniaxially stretched to a total stretch ratio of 5.5 times in the longitudinal direction between rolls at different peripheral speeds while it was immersed in an aqueous boric acid solution (an aqueous solution obtained by adding 4 parts by weight of boric acid and 5 parts by weight of potassium iodide to 100 parts by weight of water) at a temperature of 70° C. (in-water stretching).

The laminate was then immersed in a cleaning bath (an aqueous solution obtained by adding 4 parts by weight of potassium iodide to 100 parts by weight of water) at a temperature of 30° C. (cleaning).

The resulting product was an optical film laminate including a 5-μm-thick polarizer.

(Preparation of polarizers A0 to A3)

Polarizers A1 to A3 were prepared similarly to the preparation of polarizer A0 described above, except that the preparation conditions were changed as shown in Table 1. Table 1 also shows the thicknesses, optical properties (single-body transmittance and polarization degree), and boric acid concentrations of polarizers A1 to A3.

TABLE 1

| | Polarizer | | | | PVA-based | | Dyeing |
|---|---|---|---|---|---|---|---|
| | Thickness (μm) | Single-body transmittance T (%) | Polarization degree P (%) | Boric acid content (wt %) | resin layer thickness (μm) | Auxiliary in-air stretch ratio | bath Iodine content (wt parts) |
| Polarizer A0 | 5 | 42.8 | 99.99 | 16 | 11 μm | 2.0 times | 0.2 parts |
| Polarizer A1 | 4 | 42.8 | 99.99 | 16 | 11 μm | 2.0 times | 0.2 parts |
| Polarizer A2 | 7 | 42.8 | 99.99 | 16 | 15 μm | 2.0 times | 0.2 parts |
| Polarizer A3 | 3.5 | 43.2 | 99.15 | 16 | 7 μm | 4.0 times | 0.2 parts |

| | Dyeing bath | | In-water stretching bath | | | | Cleaning bath |
|---|---|---|---|---|---|---|---|
| | Potassium iodide content (wt parts) | Immersion time | Boric acid | Potassium iodide content (wt parts) | Stretch ratio | Total stretch ratio | Potassium iodide content (wt parts) |
| Polarizer A0 | 1.0 part | 60 seconds | 4.0 parts | 5 parts | 2.75 times | 5.5 times | 4 parts |
| Polarizer A1 | 1.0 part | 60 seconds | 4.0 parts | 5 parts | 2.75 times | 6.0 times | 4 parts |
| Polarizer A2 | 1.0 part | 60 seconds | 4.0 parts | 5 parts | 2.75 times | 5.5 times | 4 parts |
| Polarizer A3 | 1.0 part | 60 seconds | 3 parts | 3 parts | Not stretched | 4.0 times | 4 parts |

(Preparation of Polarizer B (12-μm-Thick Polarizer))

A 30-μm-thick polyvinyl alcohol film with an average degree of polymerization of 2,400 and a degree of saponification of 99.9% by mole was immersed in warm water at 30° C. for 60 seconds so that it was allowed to swell. Subsequently, the film was immersed in an aqueous solution of 0.3% iodine/potassium iodide (0.5/8 in weight ratio) and dyed while stretched to 3.5 times. The film was then stretched to a total stretch ratio of 6 times in an aqueous boric ester solution at 65° C. After the stretching, the film was dried in an oven at 40° C. for 3 minutes to give a PVA-based polarizer. The resulting polarizer was 12 μm in thickness.

(Preparation of Polarizer C)

A corona treatment was performed on one surface of an amorphous isophthalic acid-copolymerized polyethylene terephthalate (IPA-copolymerized PET) film substrate (130 μm in thickness) with a water absorption of 0.75% and a Tg of 75° C. An aqueous solution containing polyvinyl alcohol (4,200 in polymerization degree, 99.2% by mole in saponification degree) and acetoacetyl-modified PVA (Gohsefimer Z200 (trade name) manufactured by The Nippon Synthetic Chemical Industry Co., Ltd., 1,200 in polymerization degree, 4.6% in acetoacetyl modification degree, 99.0% by mole or more in saponification degree) in a ratio of 9:1 was applied to the corona-treated surface at 25° C. and then dried to form a 11-μm-thick PVA-based resin layer, so that a laminate was formed.

Using a simultaneous biaxial stretching machine, the resulting laminate was shrunk at 110° C. in a first direction (MD) by 30% and simultaneously stretched in a second direction (TD) to 5.0 times in the air (stretching).

Subsequently, the laminate was immersed in an aqueous iodine solution (iodine concentration: 0.2% by weight, potassium iodide concentration: 1.4% by weight) at 25° C. for 40 seconds (dyeing).

The dyed laminate was immersed in an aqueous boric acid solution (boric acid concentration: 5% by weight, potassium iodide concentration: 5% by weight) at 60° C. for 80 seconds (crosslinking).

After the crosslinking, the laminate was immersed in an aqueous potassium iodide solution (potassium iodide concentration: 5% by weight) at 25° C. for 20 seconds (cleaning).

The resulting product was an optical film laminate including a 3-μm-thick polarizer.

<Protective Film>

Acrylic Film 1

The adhesion facilitation-treated surface of a lactone ring structure-containing (meth)acrylic resin film with a thickness of 40 μm was subjected to a corona treatment. The corona-treated film was used as a protective film.

Acrylic Film 2

The adhesion facilitation-treated surface of a lactone ring structure-containing (meth)acrylic resin film with a thickness of 60 μm was subjected to a corona treatment. The corona-treated film was used as a protective film.

Acrylic Film 3

The adhesion facilitation-treated surface of a lactone ring structure-containing (meth)acrylic resin film with a thickness of 20 μm was subjected to a corona treatment. The corona-treated film was used as a protective film.

TAC 1

A 60-μm-thick triacetylcellulose film was used as a protective film.

TAC 2

A 40-μm-thick triacetylcellulose film was used as a protective film.

<Preparation of Adhesive for Use on Protective Film>

(Acrylic Adhesive 1)

Acrylic adhesive 1 has the same composition as that of the acryl-based, layer-forming material (acrylic 1) for the transparent resin layer.

(Acrylic Adhesive 2)

N-hydroxyethylacrylamide (HEAA (trade name) manufactured by KOHJIN Film & Chemicals Co., Ltd.) 12.5 parts Acryloylmorpholine (ACMO® (trade name) manufactured by KOHJIN Film & Chemicals Co., Ltd.) 25 parts Dimethylol tricyclodecane diacrylate (LIGHT ACRYLATE DCP-A (trade name) manufactured by Kyoeisha Chemical Co., Ltd.)

62.5 Parts

Photo-radical polymerization initiator (2-methyl-1-(4-methylthiophenyl)-2-morpholinopropan-1-one (IRGACURE 907 (trade name) manufactured by BASF)) 2 parts Photosensitizer (diethyl thioxanthone (KAYACURE DETX-S (trade name) manufactured by Nippon Kayaku Co., Ltd.)) 2 parts (Acrylic adhesive 3)

N-hydroxyethylacrylamide (HEAA (trade name) manufactured by KOHJIN Film & Chemicals Co., Ltd.) 12.5 parts 2-hyroxy-3-phenoxypropyl acrylate (ARONIX® M-5700 (trade name) manufactured by Toagosei Co., Ltd.) 25 parts 1, 9-nonanediol diacrylate (LIGHT ACRYLATE 1.9ND-A (trade name) manufactured by Kyoeisha Chemical Co., Ltd.) 40 parts Dimethylol tricyclodecane diacrylate (LIGHT ACRYLATE DCP-A (trade name) manufactured by Kyoeisha Chemical Co., Ltd.)

22.5 Parts

Photo-radical polymerization initiator (2-methyl-1-(4-methylthiophenyl)-2-morpholinopropan-1-one (IRGACURE 907 (trade name) manufactured by BASF)) 3 parts Photosensitizer (diethyl thioxanthone (KAYACURE DETX-S (trade name) manufactured by Nippon Kayaku Co., Ltd.))

2 Parts (Epoxy Adhesive 3)

Epoxy adhesive 3 has the same composition as that of the epoxy-based, layer-forming material (epoxy 1) for the transparent resin layer.

(PVA Adhesive)

An aqueous solution with an adjusted solid concentration of 3.7% was prepared by dissolving 100 parts of an acetoacetyl group-containing, polyvinyl alcohol-based resin (1,200 in average degree of polymerization, 98.5 mol % in saponification degree, 5 mol % in acetoacetylation degree) and 50 parts of methylolmelamine in pure water under conditions at a temperature of 30° C. A PVA adhesive was prepared by adding 18 parts of an aqueous alumina colloidal solution (15 nm in average particle size, 10% in solid concentration, positive charge) to 100 parts of the aqueous solution.

<Transparent Resin Layer-Forming Material>

(Polyvinyl Alcohol-Based, Layer-Forming Material (PVA1))

An aqueous solution with a solid concentration of 4% by weight was prepared by dissolving a polyvinyl alcohol resin with a polymerization degree of 2,500 and a saponification degree of 99.7 mol % in pure water.

(Composition of Acryl-Based, Layer-Forming Material (Acrylic 1))

N-hydroxyethylacrylamide (HEAA (trade name) manufactured by KOHJIN Film & Chemicals Co., Ltd.) 20 parts Urethane acrylate (UV-1700B (trade name) manufactured by The Nippon Synthetic Chemical Industry Co., Ltd.) 80 parts Photo-radical polymerization initiator (2-methyl-1-(4-methylthiophenyl)-2-morpholinopropan-1-one (IRGACURE 907 (trade name) manufactured by BASF)) 3 parts Photosensitizer (diethyl thioxanthone (KAYACURE DETX-S (trade name) manufactured by Nippon Kayaku Co., Ltd.))

2 parts (Composition of Epoxy-Based, Layer-Forming Material (Epoxy 1))

3',4'-epoxycyclohexylmethyl 3,4-epoxycyclohexanecarboxylate (CELLOXIDE 2021P (trade name) manufactured by DAICEL CORPORATION) 100 parts Photo-cation polymerization initiator (4-(phenylthio)phenyldiphenylsulfonium hexafluorophosphate (CPI-100P (trade name) manufactured by SAN-APRO LTD.) 1 part (Preparation of Active Energy Ray-Curable, Layer-Forming Materials)

Different active energy ray-curable, layer-forming materials were prepared by mixing each set of materials for the acryl-based or epoxy-based, adhesive or transparent resin layer-forming material shown above, and stirring the materials at 50° C. for 1 hour.

<Formation of Pressure-Sensitive Adhesive Layer>
(Acrylic Pressure-Sensitive Adhesive 1)
<<Preparation of Acryl-Based Polymer>>

A four-necked flask equipped with a stirring blade, a thermometer, a nitrogen gas inlet tube, and a condenser was charged with 99 parts of butyl acrylate and 1 part of 4-hydroxybutyl acrylate. To the resulting monomer mixture was further added 0.1 parts of 2,2'-azobisisobutyronitrile as a polymerization initiator together with ethyl acetate based on 100 parts (solid basis) of the monomer mixture. After nitrogen gas was introduced to replace the air under gentle stirring, the mixture was subjected to polymerization reaction for 7 hours while the temperature of the liquid in the flask was kept at around 60° C. Ethyl acetate was then added to the resulting reaction liquid, so that a solution of an acryl-based polymer with a weight average molecular weight of 1,400,000 was obtained with an adjusted solid concentration of 30%.

<<Preparation of Pressure-Sensitive Adhesive Composition>>

An acryl-based pressure-sensitive adhesive solution was prepared by adding 0.2 parts of ethylmethylpyrrolidinium-bis(trifluoromethanesulfonyl)imide (manufactured by Tokyo Chemical Industry Co., Ltd.), 1 part of lithium bis(trifluoromethanesulfonyl)imide (manufactured by Mitsubishi Materials Electronic Chemicals Co., Ltd.), 0.1 parts of trimethylolpropane xylylene diisocyanate (TAKENATE D110N manufactured by Mitsui Chemicals, Inc.), 0.3 parts of dibenzoyl peroxide, and 0.075 parts of γ-glycidoxypropylmethoxysilane (KBM-403 manufactured by Shin-Etsu Chemical Co., Ltd.) to the acryl-based polymer solution based on 100 parts of the solids of the polymer solution.

(Acrylic Pressure-Sensitive Adhesive 2)

A solution of an acryl-based polymer with a weight average molecular weight of 1,100,000 was prepared similarly to the preparation of the acryl-based polymer for acryl-based pressure-sensitive adhesive 1 shown above, except that the monomer mixture used included 65 parts of butyl acrylate, 34 parts of methyl methacrylate, and 1 part of 4-hydroxybutyl acrylate and toluene was used as the solvent instead of ethyl acetate. An acryl-based pressure-sensitive adhesive solution was also prepared as a pressure-sensitive adhesive composition similarly to the preparation of acryl-based pressure-sensitive adhesive 1, except that 1 part of a crosslinking agent (CORONATE L (trade name) manufactured by Nippon Polyurethane Industry Co., Ltd.) including an isocyanate group-containing compound as a main component was used instead of 0.1 parts of trimethylolpropane xylylene diisocyanate (TAKENATE D110N manufactured by Mitsui Chemicals, Inc.).

(Acrylic Pressure-Sensitive Adhesive 3)

A solution of an acryl-based polymer with a weight average molecular weight of 2,200,000 was prepared similarly to the preparation of the acryl-based polymer for acryl-based pressure-sensitive adhesive 1 shown above, except that the monomer mixture used included 95 parts of butyl acrylate, 4 parts of acrylic acid, and 1 part of 4-hydroxybutyl acrylate and toluene was used as the solvent instead of ethyl acetate. An acryl-based pressure-sensitive adhesive solution was also prepared as a pressure-sensitive adhesive composition similarly to the preparation of acryl-based pressure-sensitive adhesive 1, except that 0.6 part of a crosslinking agent (CORONATE L (trade name) manufactured by Nippon Polyurethane Industry Co., Ltd.) including an isocyanate group-containing compound as a main component was used instead of 0.1 parts of trimethylolpropane xylylene diisocyanate (TAKENATE D110N manufactured by Mitsui Chemicals, Inc.).

Examples 1 to 28 and Comparative Examples 1 to 5

(Preparation of One-Side-Protected Polarizing Films)

Each one-side-protected polarizing film was prepared using the polarizer, the adhesive, and the protective film shown in Table 1. Table 2 shows the optical properties (single-body transmittance and polarization degree) of each resulting one-side-protected polarizing film. Note that in Example 9 where two protective films were used, the adhesive layer shown in Table 1 was also used to laminate the two protective films.

When polarizers A0 to A3 and C were each used as described above, the protective film was bonded to the surface of the polarizer of the optical film laminate with the adhesive layer, with the thickness shown in Table 1, interposed between them. Subsequently, the amorphous PET substrate was peeled off, so that a one-side-protected polarizing film having the thin polarizer was obtained. When polarizer B was used, the protective film was bonded to one surface of the PVA-based polarizer with the adhesive layer, with the thickness shown in Table 1, interposed between them.

When acrylic adhesives 1 to 3 and epoxy adhesive 1 were each used as described above (when each ultraviolet-curable adhesive was used), the protective film was bonded to the surface of the polarizer with the adhesive being applied to the surface in such a manner as to form an adhesive layer with the thickness shown in Table 1 after curing, and then ultraviolet rays were applied as active energy rays to cure the adhesive. The ultraviolet rays were applied using the following conditions: gallium-containing metal halide lamp; irradiator, Light Hammer 10 manufactured by Fusion UV Systems, Inc.; valve, V valve; peak illuminance, 1,600 mW/cm$^2$; total dose, 1,000/mJ/cm$^2$ (wavelength 380-440 nm). The illuminance of the ultraviolet rays was measured with Sola-Check System manufactured by Solatell Ltd. When the PVA-based adhesive was used, the protective film was bonded to the surface of the polarizer with the adhesive being applied to the surface in such a manner as to form an adhesive layer with the thickness shown in Table 1 after drying, and then the adhesive was dried at 60° C. for 1 minute.

<Preparation of Transparent Resin Layer-Attached One-Side-Protected Polarizing Films>

Each transparent resin layer-forming material shown in Table 2 was used to form a transparent resin layer, with the thickness shown in Table 2, on the surface of the polarizer of the one-side-protected polarizing film (the surface of the polarizer opposite to its surface provided with the transparent protective film), so that each transparent resin layer-attached one-side-protected polarizing film was obtained.

When acrylic 1 or epoxy 1 was used as the transparent resin layer-forming material, the material was applied to the polarizer surface with a wire bar coater and then irradiated with active energy rays under a nitrogen atmosphere to form a transparent resin layer. The active energy ray irradiation was performed by the same method as used in the preparation of the one-side-protected polarizing film.

When PVA 1 was used as the transparent resin layer-forming material as described above, the layer-forming material adjusted to 25° C. was applied with a wire bar so as to form a coating with the thickness shown in Table 2 after drying, and then dried with hot air at 60° C. for 1 minute to form a transparent resin layer-attached one-side-protected polarizing film.

<Preparation of Pressure-Sensitive-Adhesive-Layer-Attached Polarizing Films>

A solution of one of acryl-based pressure-sensitive adhesives 1 to 3 shown above was uniformly applied with a fountain coater to the surface of the silicone-based release agent-treated surface of a polyethylene terephthalate film (separator film) in such a manner that a coating with a thickness of 5 μm, 15 μm, 20 μm, or 40 μm could be formed after drying. Subsequently, the adhesive solution was dried in an air circulation-type thermostatic oven at 155° C. for 2 minutes to form a pressure-sensitive adhesive layer on the surface of the separator film.

Subsequently, the pressure-sensitive adhesive layer of the type and thickness shown in Table 2, formed on the release-treated surface of the release sheet (separator), was bonded to the transparent resin layer formed on the one-side-protected polarizing film to form a pressure-sensitive-adhesive-layer-attached polarizing film.

The pressure-sensitive-adhesive-layer-attached polarizing films obtained in the examples and the comparative examples were evaluated as described below. The results are shown in Table 2.

<Single-Body Transmittance T and Polarization Degree P of Polarizer>

The single-body transmittance T and polarization degree P of the resulting one-side-protected polarizing films were measured using an integrating sphere-equipped spectral transmittance meter (DOT-3C manufactured by Murakami Color Research Laboratory Co., Ltd.).

The polarization degree P is calculated from the formula below using the transmittance (parallel transmittance Tp) of a laminate of the same two polarizing films with their transmission axes parallel to each other and the transmittance (crossed transmittance Tc) of a laminate of the same two polarizing films with their transmission axes orthogonal to each other. Polarization degree P (%)={(Tp−Tc)/(Tp+Tc)}$^{1/2}$×100

Each transmittance was expressed as the Y value, which was obtained through luminosity correction using the two-degree field (illuminant C) according to JIS Z 8701 when the transmittance for completely polarized light obtained through a Glan-Taylor prism polarizer was normalized to 100%.

<Measurement of the Content of Boric Acid in Polarizer>

The polarizers obtained in the examples and the comparative examples were subjected to attenuated total reflection (ATR) spectroscopy using polarized light as the measurement light and using a Fourier transform infrared spectrometer (FTIR) (Spectrum 2000 (trade name) manufactured by PerkinElmer, Inc.), in which the boric acid peak (665 cm$^{-1}$) intensity and the reference peak (2,941 cm$^{-1}$) intensity were measured. The boric acid amount index was calculated from the formula below using the resulting boric acid peak intensity and reference peak intensity, and then the boric acid content (% by weight) was determined from the formula below using the calculated boric acid amount index.

(Boric acid amount index)=(the intensity of the boric acid peak at 665 cm$^{-1}$)/(the intensity of the reference peak at 2,941 cm$^{-1}$)

(Boric acid content (% by weight))=(boric acid amount index)×5.54+4.1

<Measurement of Compressive Elastic Modulus at 80° C.>

The compressive elastic modulus was measured using TI900 TriboIndenter (manufactured by Hysitron Inc.). A piece with a size of 10 mm×10 mm was cut from resulting transparent layer-attached, one-side-protected polarizing film 11, then fixed on the support attached to TriboIndenter, and then subjected to the measurement of compressive elastic modulus by nanoindentation method. In the measurement, the position of the indenter was so adjusted that it would indent a portion at or near the center of the transparent resin layer. The measurement conditions are shown below.

Indenter used: Berkovich (triangular pyramid type)
Measurement method: single indentation measurement
Measurement temperature: 80° C.
Indentation depth setting: 100 nm <Measurement of Storage Modulus>

The storage modulus at 23° C. was measured using a viscoelastic spectrometer (RSA-II (trade name)) manufactured by Rheometric Scientific, Inc. The measurement value at 23° C. was obtained under the following measurement conditions: frequency 1 Hz, sample thickness 2 mm, pressure-bonding load 100 g, rate of temperature increase 5° C./min in the range of −50° C. to 200° C.

<Suppression of the Occurrence of Nano-Slits (Guitar Pick Test)>

A piece with a size of 50 mm×150 mm (50 mm in the absorption axis direction) was cut from the resulting pressure-sensitive-adhesive-layer-attached polarizing film. The resulting piece was called sample 11. When sample 11 used, surface protective film 6 prepared by the method described below was bonded to the transparent protective film 2 side of sample 11.

(Surface Protective Film for Test)

A backing-forming material of low-density polyethylene with a melt flow rate of 2.0 g/10 min at 190° C. and a density of 0.924 g/cm$^3$ was supplied to an inflation molding machine for co-extrusion.

At the same time, a pressure-sensitive adhesive-forming material of a propylene-butene copolymer (propylene: butene=85:15 in weight ratio, atactic structure) with a melt flow rate of 10.0 g/10 min at 230° C. and a density of 0.86 g/cm$^3$ was supplied to the inflation molding machine with a die temperature of 220° C. and subjected to co-extrusion. A surface protective film composed of a 33-μm-thick backing layer and a 5-μm-thick pressure-sensitive adhesive layer was produced in this way.

Figure 5A:
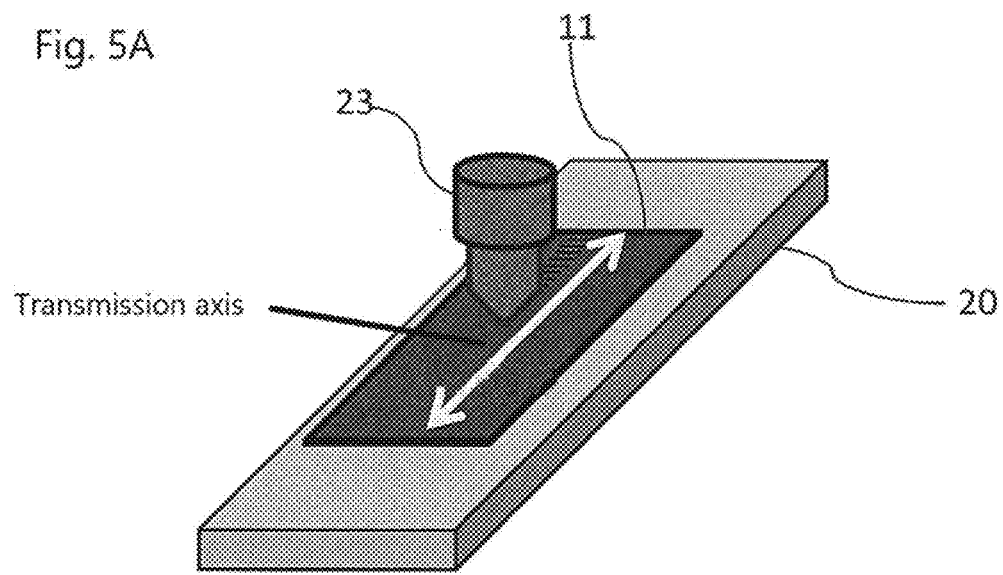
FIGS. 5A and 5B are schematic views illustrating items to be evaluated for nano-slits in examples and comparative examples.
Figure 5B:
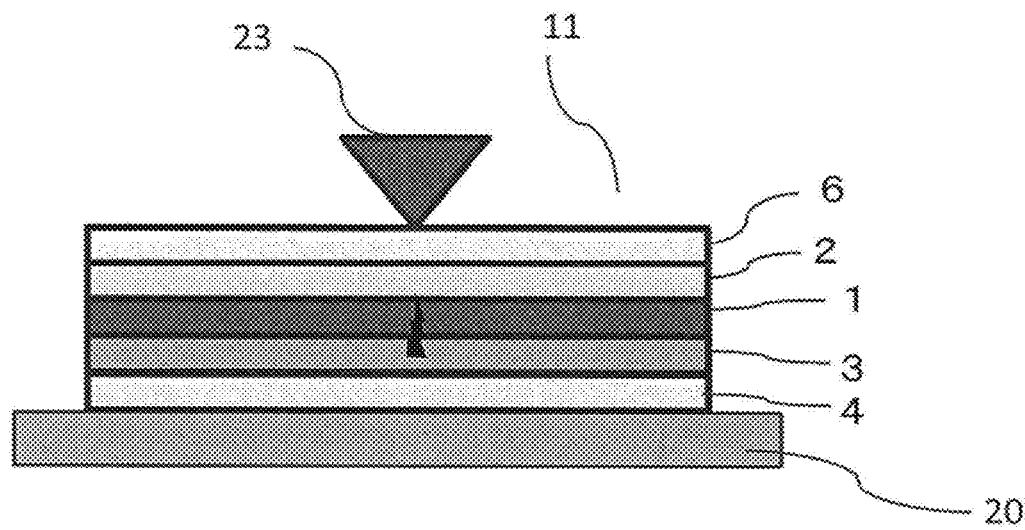

Subsequently, as shown in the schematic view of FIG. 5A and the cross-sectional view of FIG. 5B, the release sheet (separator) was peeled off from the sample, and the exposed pressure-sensitive adhesive layer 4 was used to bond the sample to a glass plate 20.

Subsequently, a load of 200 g was applied from a guitar pick (Model No. HP2H (HARD) manufactured by HISTORY) to the center of sample 11 (surface protective film 6 side), and the applied load was reciprocated 50 times within a distance of 100 mm in the direction perpendicular to the absorption axis of polarizer 1 of sample 11. The load was applied to one portion.

Subsequently, after sample 11 was allowed to stand in an environment at 80° C. for 1 hour, it was evaluated whether light-leaking cracks occurred in sample 11, based on the following criteria.

⊙: no cracks
◯: 1 to 5 cracks
Δ: 6 to 20 cracks
×: 21 or more cracks

Figure 6B:
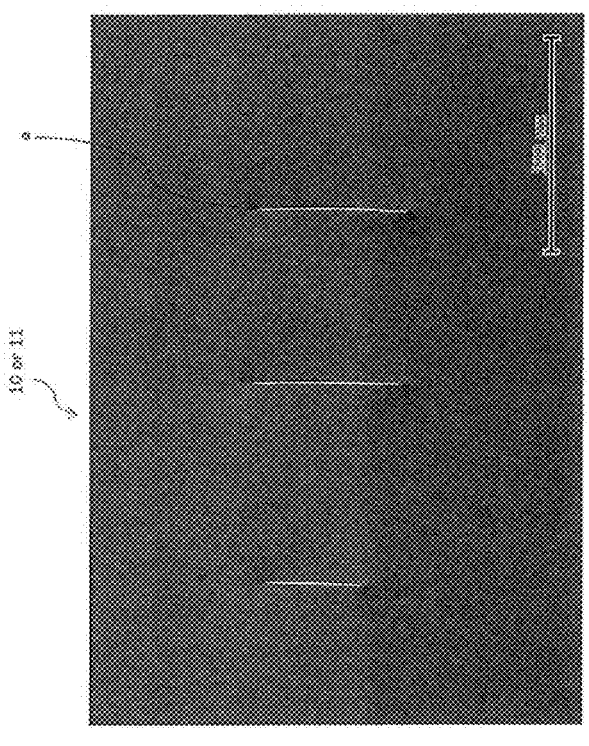
FIGS. 6A and 6B are exemplary photographs showing whether cracks are caused by nano-slits, for the evaluation of examples and comparative examples.
Figure 6A:
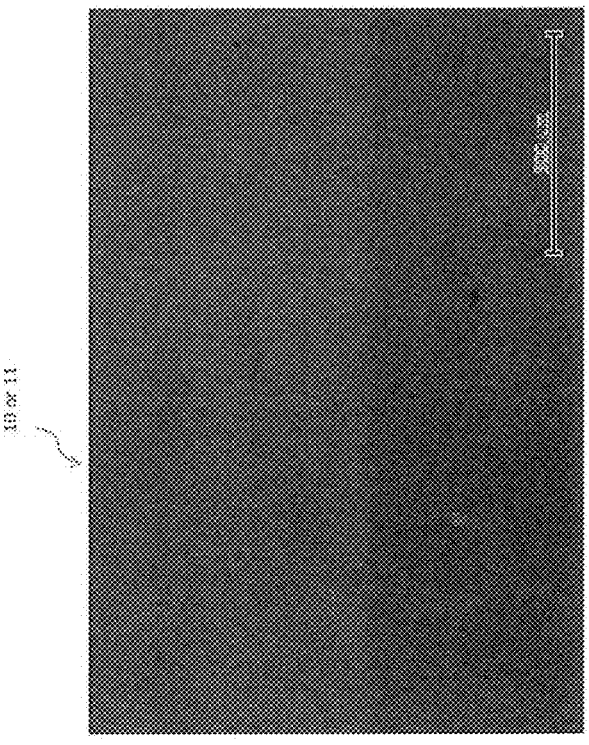

FIGS. 6A and 6B are each an exemplary micrograph of the polarizing film surface, which provides the measure below for identifying light-leaking cracks (nano-slits a) in the guitar pick testing of one-side-protected polarizing film 10 or transparent resin layer-attached one-side-protected polarizing film 11. In FIG. 6A, any light-leaking cracks caused by nano-slits a are not found. The state shown in FIG. 6A corresponds to the state before the heating in the guitar pick test on the comparative examples, and the state after the heating in the rock and roll test on the examples (nano-slits do not cause light leakage due to the expansion-suppressing effect). On the other hand, FIG. 6B shows a case where three light-leaking cracks occur in the direction of the absorption axis of the polarizer due to nano-slits a formed by heating. The state shown in FIG. 6B corresponds to the state after the heating in the guitar pick test on the comparative examples. FIGS. 6A and 6B were obtained by observing the samples suffering from nano-slits using a differential interference microscope. When each sample was photographed, another sample with no nano-slits was placed on the lower side (transmitted light source side) of the sample suffering from nano-slits in such a manner that they were in a crossed-Nicols arrangement, and then they were observed with transmitted light.

<Observation of Through Cracks (Heat Shock Test)>

A piece of 50 mm×150 mm (50 mm in the absorption axis direction) and a piece of 150 mm×50 mm (150 mm in the absorption axis direction) were cut from each resulting pressure-sensitive-adhesive-layer-attached polarizing film. The cut pieces were bonded in the directions of crossed Nicols to both sides a 0.5-mm-thick non-alkali glass sheet to form a sample. The sample was exposed to the environment of 300 cycles of heat shock from −40 to 85° C. each for 30 minutes. Subsequently, the sample was taken out and visually observed for the presence or absence of through cracks (and the number of through cracks) in the pressure-sensitive-adhesive-layer-attached polarizing film. This test was performed five times. The number of cracked samples was evaluated according to the following.

⊙: 0
◯: 1
Δ: 2
x: 3 or more

Figure 7:
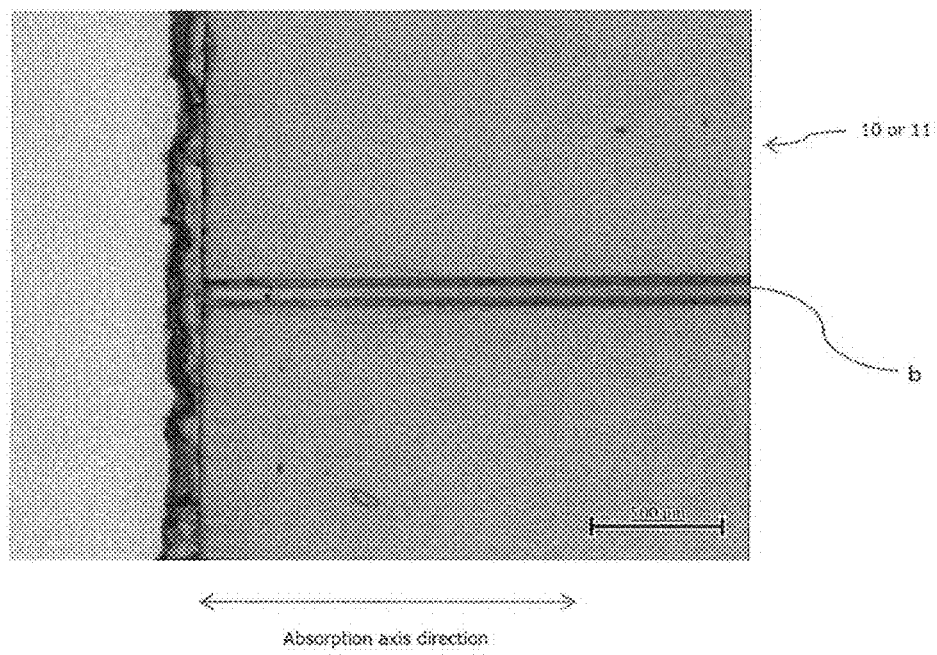
FIG. 7 is an exemplary photograph showing progress of a through crack for the evaluation of examples and comparative examples.

FIG. 7 is an exemplary micrograph of the polarizing film surface, which provides a measure for identifying a through crack b in one-side-protected polarizing film 10 or transparent resin layer-attached one-side-protected polarizing film 11. FIG. 7 was obtained by observing the sample suffering from a through crack using a differential interference microscope.

<Amount of Curl>

The separator was peeled off from each resulting pressure-sensitive-adhesive-layer-attached polarizing film. Subsequently, the pressure-sensitive-adhesive-layer-attached polarizing film was allowed to stand under the conditions of 23° C. and 55% R.H. for 30 days with the pressure-sensitive adhesive layer surface facing upward. Thereafter, the curl height (mm) of the film was measured and evaluated according to the following criteria.

TABLE 2

| | One-side-protected polarizing film | | | | | | | | | Protective film 2 Thickness (μm) |
|---|---|---|---|---|---|---|---|---|---|---|
| | Polarizer | | | | Adhesive layer | | | Protective film 1 | | |
| | Type | Thickness X (μm) | Single-body transmittance T (%) | Polarization degree P (%) | Boric acid content (wt %) | Thickness (μm) | Type | Compressive elastic modulus (GPa) | Thickness (μm) | Type | |
| Example 1 | A0 | 5 | 42.8 | 99.99 | 16 | 0.8 | Acrylic adhesive 1 | 5.4 | 40 | Acrylic film 1 | — |
| Example 2 | A0 | 5 | 42.8 | 99.99 | 16 | 1.2 | Acrylic adhesive 1 | 5.4 | 40 | Acrylic film 1 | — |
| Example 3 | A0 | 5 | 42.8 | 99.99 | 16 | 1.2 | Acrylic adhesive 1 | 5.4 | 40 | Acrylic film 1 | — |
| Example 4 | A0 | 5 | 42.8 | 99.99 | 16 | 1.2 | Acrylic adhesive 1 | 5.4 | 40 | Acrylic film 1 | — |
| Example 5 | A1 | 4 | 42.8 | 99.99 | 16 | 1.2 | Acrylic adhesive 1 | 5.4 | 40 | Acrylic film 1 | — |
| Example 6 | A0 | 5 | 42.8 | 99.99 | 16 | 1.2 | Acrylic adhesive 1 | 5.4 | 60 | Acrylic film 2 | — |
| Example 7 | A0 | 5 | 42.8 | 99.99 | 16 | 1.2 | Acrylic adhesive 1 | 5.4 | 20 | Acrylic film 3 | — |
| Example 8 | A0 | 5 | 42.8 | 99.99 | 16 | 1.2 | Acrylic adhesive 1 | 5.4 | 60 | TAC film 1 | — |
| Example 9 | A0 | 5 | 42.8 | 99.99 | 16 | 1.2 | Acrylic adhesive 1 | 5.4 | 40 | Acrylic film 1 | 60 |
| Example 10 | A0 | 5 | 42.8 | 99.99 | 16 | 1.2 | Acrylic adhesive 1 | 5.4 | 40 | Acrylic film 1 | — |
| Example 11 | A0 | 5 | 42.8 | 99.99 | 16 | 1.2 | Acrylic adhesive 1 | 5.4 | 40 | Acrylic film 1 | — |
| Example 12 | A0 | 5 | 42.8 | 99.99 | 16 | 1.2 | Acrylic adhesive 1 | 5.4 | 40 | Acrylic film 1 | — |
| Example 13 | A0 | 5 | 42.8 | 99.99 | 16 | 1.2 | Acrylic adhesive 1 | 5.4 | 40 | Acrylic film 1 | — |
| Example 14 | A0 | 5 | 42.8 | 99.99 | 16 | 1.2 | Acrylic adhesive 1 | 5.4 | 40 | Acrylic film 1 | — |

TABLE 2-continued

| | | | | | | | | | | | |
|---|---|---|---|---|---|---|---|---|---|---|---|
| Example 15 | A0 | 5 | 42.8 | 99.99 | 16 | 1.2 | Acrylic adhesive 2 | 10.1 | 40 | Acrylic film 1 | — |
| Example 16 | A0 | 5 | 42.8 | 99.99 | 16 | 1.2 | Acrylic adhesive 3 | 0.2 | 40 | Acrylic film 1 | — |
| Example 17 | A0 | 5 | 42.8 | 99.99 | 16 | 1.2 | Acrylic adhesive 1 | 5.4 | 40 | Acrylic film 1 | — |
| Example 18 | A0 | 5 | 42.8 | 99.99 | 16 | 1.2 | Acrylic adhesive 1 | 5.4 | 40 | Acrylic film 1 | — |
| Example 19 | B | 12 | 42.8 | 99.99 | 16 | 1.2 | Acrylic adhesive 1 | 5.4 | 40 | Acrylic film 1 | — |
| Example 20 | A2 | 7 | 42.8 | 99.99 | 16 | 1 | Epoxy adhesive 1 | 3.6 | 40 | Acrylic film 1 | — |
| Example 21 | A2 | 7 | 42.8 | 99.99 | 16 | 1 | Epoxy adhesive 1 | 3.6 | 40 | Acrylic film 1 | — |
| Example 22 | A2 | 7 | 42.8 | 99.99 | 16 | 1.2 | Acrylic adhesive 1 | 5.4 | 40 | Acrylic film 1 | — |
| Example 23 | A2 | 7 | 42.8 | 99.99 | 16 | 1.2 | Acrylic adhesive 1 | 5.4 | 40 | Acrylic film 1 | — |
| Example 24 | A2 | 7 | 42.8 | 99.99 | 16 | 0.18 | PVA adhesive 1 | 9.0 | 40 | Acrylic film 1 | — |
| Example 25 | A2 | 7 | 42.8 | 99.99 | 16 | 1 | Epoxy adhesive 1 | 3.6 | 40 | Acrylic film 1 | — |
| Example 26 | A2 | 7 | 42.8 | 99.99 | 16 | 1 | Epoxy adhesive 1 | 3.6 | 40 | Acrylic film 1 | — |
| Example 27 | A0 | 5 | 42.8 | 99.99 | 14 | 1.2 | Acrylic adhesive 1 | 5.4 | 40 | Acrylic film 1 | — |
| Example 28 | A0 | 5 | 42.8 | 99.99 | 20 | 1.2 | Acrylic adhesive 1 | 5.4 | 40 | Acrylic film 1 | — |
| Comparative Example 1 | A0 | 5 | 42.8 | 99.99 | 16 | 1.2 | Acrylic adhesive 3 | 0.2 | 40 | Acrylic film 1 | — |
| Comparative Example 2 | A0 | 5 | 42.8 | 99.99 | 16 | 1.2 | Acrylic adhesive 1 | 5.4 | 40 | Acrylic film 1 | — |
| Comparative Example 3 | B | 12 | 42.8 | 99.99 | 16 | 1.2 | Acrylic adhesive 1 | 5.4 | 40 | Acrylic film 1 | — |
| Comparative Example 4 | C | 3 | 38.4 | 99.99 | 16 | 1.2 | Acrylic adhesive 1 | 5.4 | 40 | Acrylic film 1 | — |
| Comparative Example 5 | A3 | 3.5 | 43.2 | 99.15 | 16 | 0.18 | Acrylic adhesive 1 | 9.0 | 40 | TAC film 2 | — |

| | One-side-protected polarizing film | Transparent resin layer | | | | Pressure-sensitive adhesive layer | | | Evaluations | | |
|---|---|---|---|---|---|---|---|---|---|---|---|
| | Protective film 2 Type | Thickness (μm) | Type | Compressive elastic modulus (GPa) | Y/X | Thickness (μm) | Type | Storage modulus (Pa) | Suppression of occurrence of nano-slits (guitar pick test) | Observation of through cracks (heat shock test) | Curl amount (mm) |
| Example 1 | — | 0.8 | PVA1 | 8.1 | 0.16 | 20 | Acrylic pressure-sensitive adhesive 1 | 5.4E+04 | ◎ | ◎ | ◎ |
| Example 2 | — | 1.2 | PVA1 | 8.1 | 0.24 | 20 | Acrylic pressure-sensitive adhesive 1 | 5.4E+04 | ◎ | ◎ | ◎ |
| Example 3 | — | 3.6 | PVA1 | 8.1 | 0.72 | 20 | Acrylic pressure-sensitive adhesive 1 | 5.4E+04 | ◎ | ◎ | ○ |
| Example 4 | — | 2.4 | PVA1 | 8.1 | 0.48 | 20 | Acrylic pressure-sensitive adhesive 1 | 5.4E+04 | ◎ | ◎ | ◎ |
| Example 5 | — | 0.8 | PVA1 | 8.1 | 0.2 | 20 | Acrylic pressure-sensitive adhesive 1 | 5.4E+04 | ○ | ◎ | ◎ |
| Example 6 | — | 1.2 | PVA1 | 8.1 | 0.24 | 20 | Acrylic pressure-sensitive adhesive 1 | 5.4E+04 | ◎ | ◎ | ◎ |
| Example 7 | — | 1.2 | PVA1 | 8.1 | 0.24 | 20 | Acrylic pressure-sensitive adhesive 1 | 5.4E+04 | ○ | ◎ | ◎ |
| Example 8 | — | 1.2 | PVA1 | 8.1 | 0.24 | 20 | Acrylic pressure-sensitive adhesive 1 | 5.4E+04 | ◎ | ◎ | Δ |
| Example 9 | TAC film 1 | 1.2 | PVA1 | 8.1 | 0.24 | 20 | Acrylic pressure-sensitive adhesive 1 | 5.4E+04 | ◎ | ◎ | ○ |
| Example 10 | — | 1.2 | PVA1 | 8.1 | 0.24 | 20 | Acrylic pressure-sensitive adhesive 2 | 8.5E+06 | ◎ | ○ | ○ |
| Example 11 | — | 1.2 | PVA1 | 8.1 | 0.24 | 20 | Acrylic pressure-sensitive adhesive 3 | 1.1E+05 | ◎ | ○ | ○ |
| Example 12 | — | 1.2 | PVA1 | 8.1 | 0.24 | 40 | Acrylic pressure-sensitive adhesive 1 | 5.4E+04 | Δ | Δ | ○ |
| Example 13 | — | 1.2 | PVA1 | 8.1 | 0.24 | 15 | Acrylic pressure-sensitive adhesive 1 | 5.4E+04 | ◎ | ◎ | ◎ |

TABLE 2-continued

| | | | | | | | | | | | |
|---|---|---|---|---|---|---|---|---|---|---|---|
| Example 14 | — | 1.2 | PVA1 | 8.1 | 0.24 | 5 | Acrylic pressure-sensitive adhesive 1 | 5.4E+04 | ◎ | ◎ | ◎ |
| Example 15 | — | 1.2 | PVA1 | 8.1 | 0.24 | 20 | Acrylic pressure-sensitive adhesive 1 | 5.4E+04 | Δ | ○ | ◎ |
| Example 16 | — | 1.2 | PVA1 | 8.1 | 0.24 | 20 | Acrylic pressure-sensitive adhesive 1 | 5.4E+04 | ◎ | Δ | ◎ |
| Example 17 | — | 1.2 | Epoxy 1 | 3.6 | 0.24 | 20 | Acrylic pressure-sensitive adhesive 1 | 5.4E+04 | Δ | ◎ | ◎ |
| Example 18 | — | 1.2 | Acrylic 1 | 5.4 | 0.24 | 20 | Acrylic pressure-sensitive adhesive 1 | 5.4E+04 | ○ | ◎ | ◎ |
| Example 19 | — | 3.6 | Acrylic 1 | 5.4 | 0.30 | 20 | Acrylic pressure-sensitive adhesive 1 | 5.4E+04 | ○ | ◎ | ◎ |
| Example 20 | — | 11 | Epoxy 1 | 3.6 | 1.57 | 20 | Acrylic pressure-sensitive adhesive 1 | 5.4E+04 | Δ | ◎ | Δ |
| Example 21 | — | 11 | Acrylic 1 | 3.6 | 1.57 | 20 | Acrylic pressure-sensitive adhesive 1 | 5.4E+04 | ○ | ◎ | Δ |
| Example 22 | — | 11 | Epoxy 1 | 3.6 | 1.57 | 20 | Acrylic pressure-sensitive adhesive 1 | 5.4E+04 | ○ | ◎ | Δ |
| Example 23 | — | 11 | Acrylic 1 | 3.6 | 1.57 | 20 | Acrylic pressure-sensitive adhesive 1 | 5.4E+04 | ○ | ◎ | Δ |
| Example 24 | — | 3.6 | PVA1 | 8.1 | 0.51 | 20 | Acrylic pressure-sensitive adhesive 1 | 5.4E+04 | ○ | ○ | ◎ |
| Example 25 | — | 3.6 | PVA1 | 8.1 | 0.51 | 20 | Acrylic pressure-sensitive adhesive 1 | 5.4E+04 | ◎ | ○ | ◎ |
| Example 26 | — | 11 | PVA1 | 8.1 | 1.57 | 20 | Acrylic pressure-sensitive adhesive 1 | 5.4E+04 | ◎ | Δ | Δ |
| Example 27 | — | 1.2 | PVA1 | 8.1 | 0.24 | 20 | Acrylic pressure-sensitive adhesive 1 | 5.4E+04 | ◎ | ◎ | ◎ |
| Example 28 | — | 1.2 | PVA1 | 8.1 | 0.24 | 20 | Acrylic pressure-sensitive adhesive 1 | 5.4E+04 | ◎ | Δ | ◎ |
| Comparative Example 1 | — | 18 | Epoxy 1 | 3.6 | 3.6 | 20 | Acrylic pressure-sensitive adhesive 1 | 5.4E+04 | ◎ | Δ | X |
| Comparative Example 2 | — | | Absent | | | 20 | Acrylic pressure-sensitive adhesive 1 | 5.4E+04 | X | ◎ | ◎ |
| Comparative Example 3 | — | | Absent | | | 20 | Acrylic pressure-sensitive adhesive 1 | 5.4E+04 | X | X | ◎ |
| Comparative Example 4 | — | | Absent | | | 20 | Acrylic pressure-sensitive adhesive 1 | 5.4E+04 | Not occurring | ○ | ○ |
| Comparative Example 5 | — | | Absent | | | 20 | Acrylic pressure-sensitive adhesive 1 | 5.4E+04 | Not occurring | ○ | Δ |

◎: 0 to 5mm
○: more than 5 mm to 10 mm
Δ: more than 10 mm to 30 mm
X: more than 30

The problems to be solved by the disclosure (the occurrence of through cracks and nano-slits) did not occurred when the optical properties represented by the single-body transmittance T and the polarization degree P did not satisfy the condition of the following formula: $P > -(10^{0.929T-42.4}-1) \times 100$ (provided that $T < 42.3$) or $P \geq 99.9$ (provided that $T \geq 42.3$), as in Comparative Example 4 or 5.

Example 29

Example 29 was similar to Example 1, except that the one-side-protected polarizing film was used in the form of a long strip, the layer-forming material was applied using a micro-gravure coater, and the release sheet (separator) and the surface protective film described below were used in the form of long strips. The resulting products were rolls of the transparent resin layer-attached one-side-protected polarizing film (with the structure shown in FIG. 2A) having the separator placed on the transparent resin layer side and having the surface protective film placed on the transparent protective film side. A set of rolls of the transparent resin layer-attached one-side-protected polarizing film were provided having widths corresponding to the short and long sides of a 32-inch non-alkali glass sheet, respectively, in order to be subjected to slit processing, in which the transparent resin layer-attached one-side-protected polarizing film was cut into pieces while being fed continuously.

(Surface Protective Film for Roll-to-Panel Process)

A surface protective film was obtained by applying an acrylic pressure-sensitive adhesive with a thickness of 15 μm to the surface of an antistatic treatment layer-attached polyethylene terephthalate film (Diafoil T100G38 (trade name) manufactured by Mitsubishi Plastics, Inc., 38 μm in thickness) opposite to its antistatically treated surface.

Using a continuous production system for the roll-to-panel process shown in FIG. 8, the transparent resin layer-attached one-side-protected polarizing films were continuously supplied from the set of rolls, and the transparent resin layer-attached one-side-protected polarizing films were continuously bonded in a cross-Nicols relationship to both sides of each of 100 sheets of 0.5-mm-thick 32-inch non-alkali glass.

Examples 30 and 31

Examples 30 and 31 were similar to Example 29, except that the transparent resin layer-attached one-side-protected polarizing films were prepared by methods similar to those in Examples 2 and 3, respectively.

<Observation of Occurrence of Nano-Slits (Heating Test)>

A hundred sheets of non-alkali glass each provided with the transparent resin layer-attached one-side-protected polarizing films bonded to both sides were placed in an oven at 80° C. for 24 hours and then visually observed for the presence or absence of nano-slits. No nano-slit-induced defect (light leakage) was observed in any of Examples of 28 to 30.

DESCRIPTION OF REFERENCE SIGNS

1 Polarizer
2 Protective film
3 Transparent resin layer
4 Pressure-sensitive adhesive layer
5, 5a, 5b Separator
6, 6a, 6b Surface protective film
10 One-side-protected polarizing film
11 One-side-protected polarizing film (with transparent resin layer)
12 Pressure-sensitive-adhesive-layer-attached polarizing film
20a, 20b Roll of pressure-sensitive-adhesive-layer-attached polarizing film (roll)
21a, 21b Pressure-sensitive-adhesive-layer-attached polarizing film (with surface protective film)
100 System for continuously producing image display devices
101a, 101b Polarizing film supply unit
151a, 151b Unwinding unit
152a, 152b Cutting unit
153a, 153b Peeling unit
154a, 154b Winding unit
201a, 201b Bonding unit
300 Orientation changing unit
P Image display panel
X Image display panel feed unit

The invention claimed is:

1. A one-side-protected polarizing film, comprising:
a polarizer;
a protective film or films provided on only one surface of the polarizer,
an adhesive layer provided between the polarizer and the protective film, and
a transparent resin layer provided on the other surface of the polarizer, wherein
the polarizer comprises a polyvinyl alcohol-based resin and is designed to have a single-body transmittance T and a polarization degree P representing optical properties satisfying the condition of the following formula:
$P > -(10^{0.929T-42.4}-1) \times 100$ (provided that T<42.3) or P≥99.9 (provided that T≥42.3),
the transparent resin layer is made from a polyvinyl alcohol-based resin,
the polarizer and the transparent resin layer have a thickness X (μm) and a thickness Y (μm), respectively, satisfying X≤12, Y≤15, and 0.15≤(Y/X)<0.5,
the adhesive layer has an 80° C. compressive elastic modulus of 3.6 GPa to 10 GPa, and
the transparent resin layer has an 80° C. compressive elastic modulus of 0.1 GPa or more.

2. The one-side-protected polarizing film according to claim 1, wherein the adhesive layer has a thickness of 0.1 μm to 5 μm.

3. The one-side-protected polarizing film according to claim 1, wherein the adhesive layer is made from an ultraviolet-curable acryl-based resin, an ultraviolet-curable epoxy-based resin, a urethane-based resin, or a polyvinyl alcohol-based resin.

4. The one-side-protected polarizing film according to claim 1, wherein the protective film is one sheet and has a thickness of 10 μm to 100 μm.

5. The one-side-protected polarizing film according to claim 1, wherein the protective films are two sheets each with a thickness of 10 μm or more, the protective films have a total thickness of 100 μm or less, and an adhesive layer or a pressure-sensitive adhesive layer is provided between the protective films.

6. The one-side-protected polarizing film according to claim 1, wherein the polarizer contains 25% by weight or less of boric acid based on the total weight of the polarizer.

7. An image display device comprising the one-side-protected polarizing film according to claim 1.

8. The one-side-protected polarizing film according to claim 1, wherein (Y/X) is 0.48 or less.

9. A pressure-sensitive-adhesive-layer-attached polarizing film comprising: the one-side-protected polarizing film according to claim 1; and a pressure-sensitive adhesive layer.

10. The pressure-sensitive-adhesive-layer-attached polarizing film according to claim 9, wherein the pressure-sensitive adhesive layer is provided on the transparent resin layer of the one-side-protected polarizing film.

11. The pressure-sensitive-adhesive-layer-attached polarizing film according to claim 9, wherein the pressure-sensitive adhesive layer is provided on the protective film of the one-side-protected polarizing film.

12. The pressure-sensitive-adhesive-layer-attached polarizing film according to claim 9, wherein the pressure-sensitive adhesive layer has a thickness of 1 μm to 40 μm.

13. The pressure-sensitive-adhesive-layer-attached polarizing film according to claim 9, wherein the pressure-sensitive adhesive layer has a storage modulus of $1.0 \times 10^4$ Pa or more at 23° C.

14. The pressure-sensitive-adhesive-layer-attached polarizing film according to claim 9, further comprising a separator provided on the pressure-sensitive adhesive layer.

15. The pressure-sensitive-adhesive-layer-attached polarizing film according to claim 14, which is in the form of a roll.

16. A method for continuously producing an image display device, the method comprising the steps of:
unwinding the pressure-sensitive-adhesive-layer-attached polarizing film from the roll of the pressure-sensitive-adhesive-layer-attached polarizing film according to claim 15;
feeding the pressure-sensitive-adhesive-layer-attached polarizing film with the separator; and
continuously bonding the pressure-sensitive-adhesive-layer-attached polarizing film to a surface of an image display panel with the pressure-sensitive adhesive layer interposed therebetween.

17. An image display device comprising the pressure-sensitive-adhesive-layer-attached polarizing film according to claim 9.

* * * * *